United States Patent
Moon

(10) Patent No.: US 11,770,236 B2
(45) Date of Patent: Sep. 26, 2023

(54) APPARATUS AND METHOD FOR PROVIDING SYNCHRONIZATION INFORMATION OF FIRST COMMUNICATION NETWORK TO SECOND COMMUNICATION NETWORK IN COMMUNICATION SYSTEM

(71) Applicant: Samsung Electronics Co., Ltd., Suwon-si (KR)

(72) Inventor: Sangjun Moon, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/486,159

(22) Filed: Sep. 27, 2021

(65) Prior Publication Data

US 2022/0103335 A1     Mar. 31, 2022

(30) Foreign Application Priority Data

Sep. 28, 2020 (KR) .................. 10-2020-0126325

(51) Int. Cl.
*H04L 7/00* (2006.01)
*H04L 47/28* (2022.01)

(52) U.S. Cl.
CPC ............ *H04L 7/0037* (2013.01); *H04L 7/005* (2013.01); *H04L 47/286* (2013.01)

(58) Field of Classification Search
CPC ..... H04L 7/0037; H04L 7/005; H04L 47/286; H04J 3/0658
See application file for complete search history.

(56) References Cited

U.S. PATENT DOCUMENTS

| 10,594,422 | B2* | 3/2020 | Zhang .................. H04J 3/0658 |
| 11,432,254 | B2* | 8/2022 | Jacobsen ............. H04W 56/003 |
| 2020/0053678 | A1 | 2/2020 | Moon et al. |
| 2020/0329441 | A1 | 10/2020 | Ha et al. |

(Continued)

FOREIGN PATENT DOCUMENTS

| KR | 10-2019-0135298 A | 12/2019 |
| KR | 10-2020-0019058 A | 2/2020 |
| KR | 10-2020-0104217 A | 9/2020 |

OTHER PUBLICATIONS

3rd Generation Partnership Project; Technical Specification Group Services and System Aspects; System architecture for the 5G System (5GS); Stage 2 (Release 16), 3GPP TS 23.501 V16.6.0, Sections 5.27.1.2.2, 5.27.1.3, 5.27.5, 5.28.1, 5.28.3.2, 5.29.2-5.29.3, Sep. 24, 2020.

(Continued)

*Primary Examiner* — Chandrahas B Patel
(74) *Attorney, Agent, or Firm* — Jefferson IP Law, LLP

(57) ABSTRACT

A method of a user equipment (UE) in a communication system for obtaining and transmitting synchronization information is provided. The method includes obtaining synchronization information from a first communication network, and transmitting the synchronization information to a second communication network. The synchronization information is updated based on an obtainment time from the first communication network and a transmission time to the second communication network. The UE operates as a device-side time sensitive networking (TSN) translator (DS-TT).

18 Claims, 30 Drawing Sheets

(56) References Cited

U.S. PATENT DOCUMENTS

2022/0322193 A1* 10/2022 Tao ...................... H04W 36/30
2022/0326728 A1* 10/2022 Gao ......................... G06F 1/08

OTHER PUBLICATIONS

Ana Larranaga et al. Analysis of 5G-TSN Integration to Support Industry 4.0. 2020 25th IEEE International Conference on Emerging Technologies and Factory Automation (ETFA), IEEE, pp. 1111-1114, Section V; and figure 1, Sep. 11, 2020.

International Search Report dated Jan. 4, 2022, issued in International Application No. PCT/KR2021/013146.

* cited by examiner

APPARATUS AND METHOD FOR PROVIDING SYNCHRONIZATION INFORMATION OF FIRST COMMUNICATION NETWORK TO SECOND COMMUNICATION NETWORK IN COMMUNICATION SYSTEM

CROSS-REFERENCE TO RELATED APPLICATION(S)

This application is based on and claims priority under 35 U.S.C. § 119(a) of a Korean patent application number 10-2020-0126325, filed on Sep. 28, 2020, in the Korean Intellectual Property Office, the disclosure of which is incorporated by reference herein in its entirety.

BACKGROUND

1. Field

The disclosure relates to a communication system. More particularly, the disclosure relates to an apparatus and a method for providing time synchronization between communication nodes, which are connected to a $5^{th}$ generation system (5GS) or of which future connections are scheduled, through expansion of a function of supporting a time sensitive network (TSN) of the $3^{rd}$ Generation Partnership Project (3GPP) 5GS.

2. Description of Related Art

To meet the ever-increasing demand for wireless data traffic since the commercialization of 4th generation (4G) communication systems, efforts have been made to develop improved $5^{th}$ generation (5G) or pre-5G communication systems. As such, 5G or pre-5G communication systems are also called "beyond 4G network system" or "post Long-Term Evolution (LTE) system". To achieve high data rates, 5G communication systems are being considered for implementation in the extremely high frequency (millimeter (mm) Wave) band (e.g., 60 gigahertz (GHz) band). To decrease path loss of radio waves and increase the transmission distance in the mmWave band, various technologies including beamforming, massive multiple-input multiple-output (massive MIMO), full dimensional MIMO (FD-MIMO), array antennas, analog beamforming, and large-scale antennas are considered for 5G communication systems. In addition, to improve system networks in 5G communication systems, technology development is under way regarding evolved small cells, advanced small cells, cloud radio access networks (cloud radio access networks (RANs)), ultra-dense networks, device-to-device (D2D) communication, wireless backhaul, moving networks, cooperative communication, coordinated multi-points (CoMP), interference cancellation, and the like. Additionally, advanced coding and modulation (ACM) schemes, such as hybrid frequency shift keying and quadrature amplitude modulation (FQAM) and sliding window superposition coding (SWSC), and advanced access technologies, such as filter bank multi carrier (FBMC), non-orthogonal multiple access (NOMA), and sparse code multiple access (SCMA) are also under development for 5G systems.

Meanwhile, the Internet is evolving from a human centered network where humans create and consume information into the Internet of Things (IoT) where distributed elements, such as things exchange and process information. There has also emerged the Internet of Everything (IoE) technology that combines IoT technology with big data processing technology through connection with cloud servers. To realize IoT, technology elements related to sensing, wired/wireless communication and network infrastructure, service interfacing, and security are needed, and technologies interconnecting things, such as sensor networks, machine-to-machine (M2M) or machine type communication (MTC) are under research in recent years. In IoT environments, it is possible to provide intelligent Internet technology services, which collect and analyze data created by interconnected things to add new values to human life. Through convergence and combination between existing information technologies and various industries, IoT technology may be applied to various areas, such as smart homes, smart buildings, smart cities, smart or connected cars, smart grids, health-care, smart consumer electronics, and advanced medical services.

Accordingly, various attempts are being made to apply 5G communication systems to IoT networks. For example, sensor networks and machine-to-machine (M2M) or machine type communication (MTC) are being realized by use of 5G communication technologies including beamforming, MIMO, and array antennas. Application of cloud RANs as a big data processing technique described above may be an instance of convergence of 5G technology and IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for transferring a precision time protocol (PTP) or a PTP message from the inside of a 3GPP network (5GS) in case that the 3GPP network, for example, a communication node of the 5GS, becomes a synchronization source, that is, operates as a network-side TSN translator (NW-TT) or a device-side TSN translator (DS-TT), and generates and provides a precision time protocol (PTP) or a generic PTP (gPTP) message to a communication node of an external network of the 5GS.

Additional aspects will be set forth in part in the description which follows and, in part, will be apparent from the description, or may be learned by practice of the presented embodiments.

In accordance with an aspect of the disclosure, a method of a user equipment (UE) in a communication system for obtaining and transmitting synchronization information is provided. The method includes obtaining synchronization information from a first communication network, and transmitting the synchronization information to a second communication network. The synchronization information is updated based on an obtainment time from the first communication network and a transmission time to the second communication network. The UE operates as a device-side TSN translator (DS-TT).

In accordance with another aspect of the disclosure, a method of a user plane function (UPF) in a communication system for obtaining and transmitting synchronization information is provided. The method includes obtaining synchronization information from a first communication network, and transmitting the synchronization information to a second communication network. The synchronization information is updated based on an obtainment time from the first communication network and a transmission time to the second communication network. The UPF operates as a network-side TSN translator (NS-TT).

According to an aspect of the disclosure, the load of the UE/network and the current consumption of the UE can be reduced by suppressing the occurrence of traffics for the unnecessary PTP or gPTP message in the 5GS. Further, the possibility of erroneous designation of the UE of which the connection to the 5GS is scheduled can be reduced. Further, according to an aspect of the disclosure, the synchronization of the 5GS can be provided to an application in which the TSN is not supported, a video image audio professional application (VIAPA). More particularly, demand environments for various clock synchronizations (syncs) can be supported by providing synchronization with individual sync message types and sync precision through providing of the clock sync in different domains with respect to respective DS-TT ports and NW-TT ports. For example, the 5GS can provide the sync in the unit of 1 µs for factory automation with respect to communication nodes of a wired network, and can provide the sync in the unit of 100 µs for audio services with respect to communication nodes of a wireless network.

Before undertaking the DETAILED DESCRIPTION below, it may be advantageous to set forth definitions of certain words and phrases used throughout this patent document, the terms "include" and "comprise," as well as derivatives thereof, mean inclusion without limitation, the term "or," is inclusive, meaning and/or, the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Other aspects, advantages, and salient features of the disclosure will become apparent to those of skill in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a term to identify a communication node or connection node, a term to denote network entities, a term to denote messages, a term to denote an interface between network entities, and a term to denote various types of identity information have been exemplified for convenience in explanation. Accordingly, the disclosure is not limited to the following terms, and other terms to denote targets having equivalent technical meanings may be used.

Hereinafter, for convenience in explanation, in the disclosure, terms and names defined in the $5^{th}$ generation system (5GS) and new radio (NR) standards, which are the latest standards defined by the $3^{rd}$ generation partnership project (3GPP) group among the currently existing communication standards, are used. However, the disclosure is not restricted by the terms and names, but may be equally applied to wireless communication networks complying with other standards. More particularly, the disclosure can be applied to the 3GPP 5GS/NR (5$^{th}$ generation mobile communication standards).

In order to support scenarios, such as factory automation, time synchronization of related communication nodes may be necessary. More particularly, in a situation in which precision work is demanded, time synchronization of a high precision may be demanded. In case of utilizing Ethernet for industrial use, a time sensitive networking (TSN) technology, which is a method for supporting time synchronization between nodes connected on Ethernet, has been researched, commercialized, and used.

Figure 1:
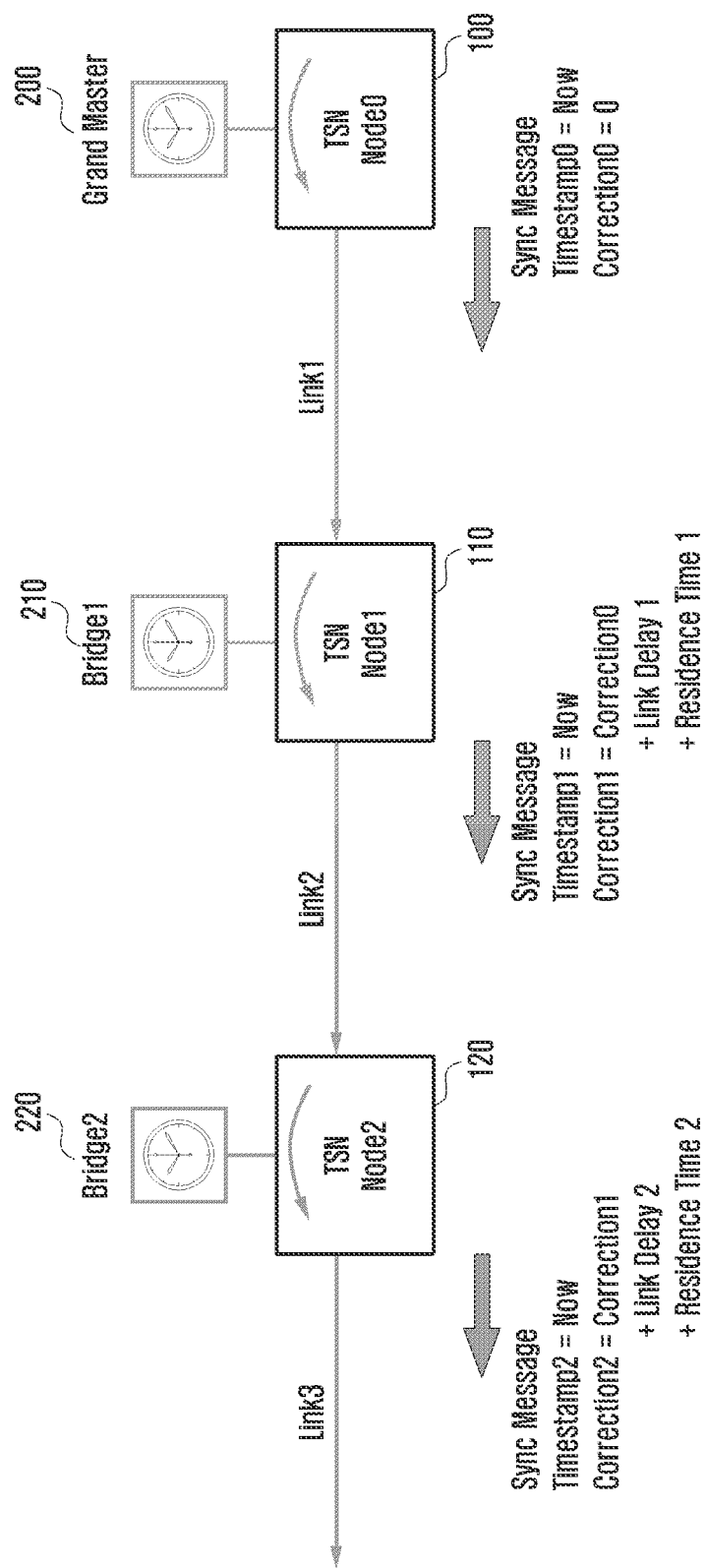
FIG. 1 is a conceptual diagram illustrating a principle of time synchronization on Ethernet of a time-sensitive networking (TSN) in a communication system according to an embodiment of the disclosure.

FIG. 1 is a conceptual diagram illustrating a principle of time synchronization on Ethernet of a time-sensitive networking (TSN) according to an embodiment of the disclosure.

Referring to FIG. 1, TSN nodes 100, 110, and 120 may determine grand masters (GMs) 200, 210, and 230 that become the standard. For example, TSN node 0 100 may input the current time of the GM 200 to a timestamp field. The TSN node 0 100 may generate a sync frame by inputting 0 to a correlation field. The TSN node 0 100 may transmit the sync frame to a next node. TSN node 1 110 that is the next node may receive the sync frame, in which link delay 1 occurs, from the TSN node 0 100. The TSN node 1 110 may transmit the sync frame to the next node by updating the correlation field based on residence time 1 that is a time in which the TSN node 1 resides in its own node. TSN node 2 120 that is the next node may receive the sync frame, in which link delay 2 occurs, from the TSN node 1 110. The TSN node 2 120 may transmit the sync frame to the next node by updating the correlation field based on residence time 2 that is a time in which the TSN node 2 resides in its own node. The respective nodes 100, 110, and 120 may periodically measure a delay time by a link with the previous node, and calculate and manage an average of the delay times. Further, the respective nodes 100, 110, and 120 may calculate the residence time in their own nodes.

Figure 2:
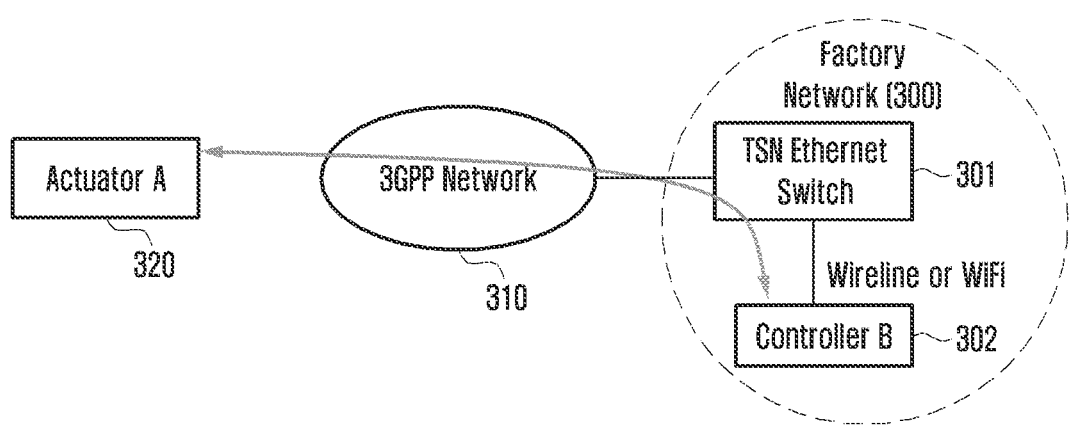
FIG. 2 is a conceptual diagram illustrating a scenario for supporting TSN time synchronization of a 5th generation (5G) network in a communication system according to an embodiment of the disclosure.

FIG. 2 is a conceptual diagram illustrating a scenario for supporting TSN time synchronization of a 5G network according to an embodiment of the disclosure.

Referring to FIG. 2, a 5G network 310 may be applied to factory automation supporting mobility. For application to the factory automation, the 5G network may support a TSN. For example, the 5G network 310 may be connected to a factory network 300 and actuator A 320. The 5G network 310 may be connected to controller B 302 through a TSN Ethernet switch 301 of the factory network 300. The controller B 302 may control the actuator A 320 through the 5G network 310.

Figure 3:
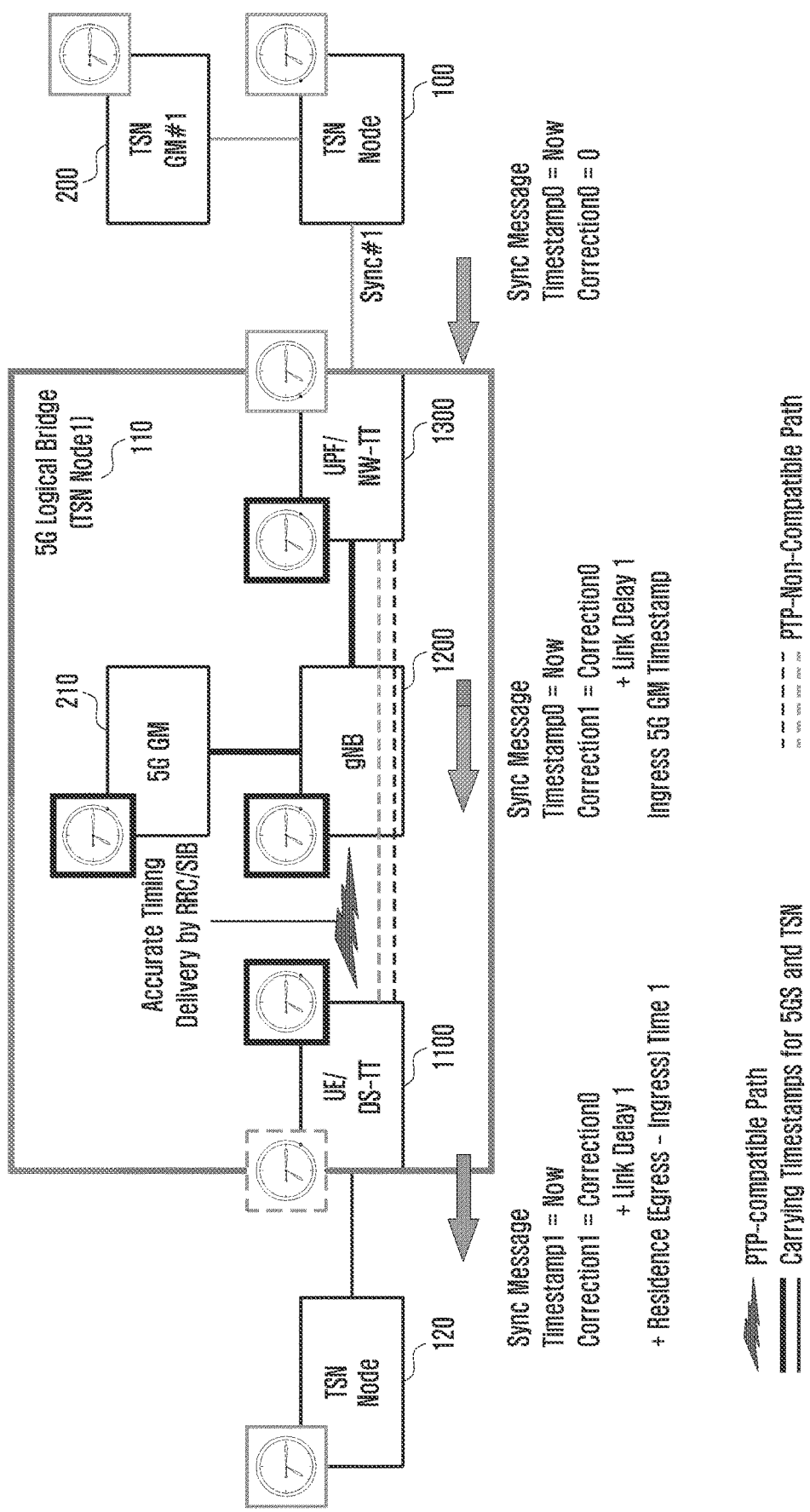
FIG. 3 is a conceptual diagram illustrating a method for supporting TSN time synchronization of a 5G network in a communication system according to an embodiment of the disclosure.

FIG. 3 is a conceptual diagram illustrating a method for supporting TSN time synchronization of a 5G network according to an embodiment of the disclosure.

Referring to FIG. 3, in a similar situation to that of FIG. 2, the 5G network may support the TSN. For example, the 5G network may be modeled as one TSN bridge (TSN node) 100, 110, and 120 of FIG. 1. For example, a UPF 1300, gNB 1200, and UE 1100, which are entities of the 5G network, may support the TSN by updating the sync frame through correlation of the link delay and the residence time as one TSN node. The UPF 1300, gNB 1200, and UE 1110 in the 5G network may be synchronized with a common 5G GM 210. For example, the gNB 1200 may be connected to a GPS. The UPF 1300 may be synchronized with the gNB 1200 by being connected to the gNB 1200 through the Ethernet-based TSN. The UE 1100 may be synchronized with the gNB 1200 through a process of transmitting and receiving a PHY frame. The UPF 1300 may be connected to the TSN node 100 of a wire network. The UE 1100 may be connected to the TSN node 120 of a wire network. Referring to FIG. 3, GM 200 of the TSN may be located in the TSN node 100 connected to the UPF 1300. The UPF 1300 may receive the sync frame from the previous TSN node 100. The UPF 1300 may determine the time based on an 5G GM 210 of the received sync frame as an ingress time. The UPF 1300 may periodically calculate and manage a link delay with the previous TSN node 100. The UPF 1300 may transmit the sync frame in which the ingress time and the link delay are reflected to the UE 1100. The UE 1100 may determine the residence time in which the UE 1100 resides in the 5G network based on the time of the 5G GM 210 at the moment that the UE 1100 transmits the sync frame to the next TSN node 120. The UE 1100 may transmit the sync frame to the next TSN node 120 by updating the correlation field based on the residence time and the link delay.

According to various embodiments of the disclosure, the UE 1100 may operate as the DS-TT. For example, the UE 1100 may be called the DS-TT or UE/DS-TT. The UPF 1300 may operate as the NW-TT. For example, the UPF 1300 may be called the NW-TT or UPF/NW-TT.

Figure 4:
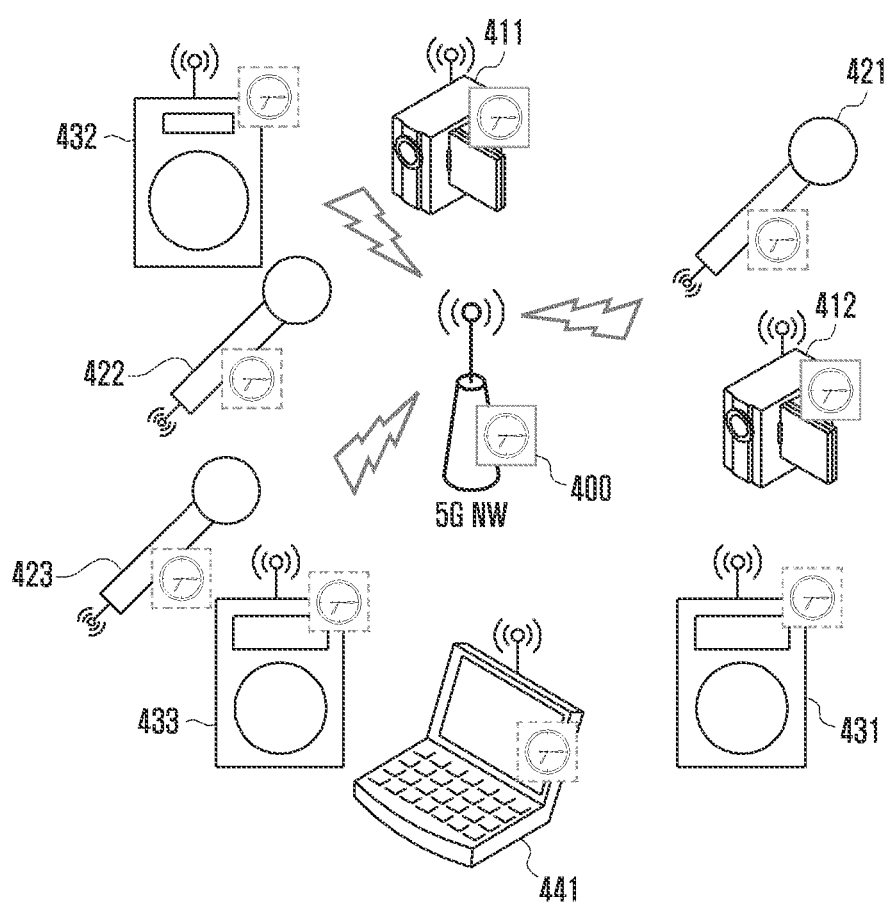
FIG. 4 is a conceptual diagram illustrating a video image audio professional application (VIAPA) in which communication nodes operating as 5G a user equipment (UE)/device-side TSN translator (DS-TT) can generate a sync message based on a 5GS clock and provide the sync message to an external network of 5GS in a communication system according to an embodiment of the disclosure.

FIG. 4 is a conceptual diagram illustrating video, imaging and audio for professional applications (VIAPA) in which all communication nodes operating as 5G UE/DS-TT can generate a sync message based on a 5GS clock and transmit the sync message to an external network of 5GS in a communication system according to an embodiment of the disclosure.

Referring to FIG. 4, devices used for the scene performance, such as cameras 411 and 412, microphones 421, 422, and 423, speakers 432, 432, and 433, and a mixing system 441, may be 5G UE/DS-TTs. For example, the above devices 411, 412, 421, 422, 423, 432, 432, and 433 may receive a sync message from the 5G network 400, and may maintain a clock sync with one another. The above devices 411, 412, 421, 422, 423, 432, 432, and 433 may support a harmonious performance by adjusting the generation time of videos, audios, and images thereof.

Figure 5:
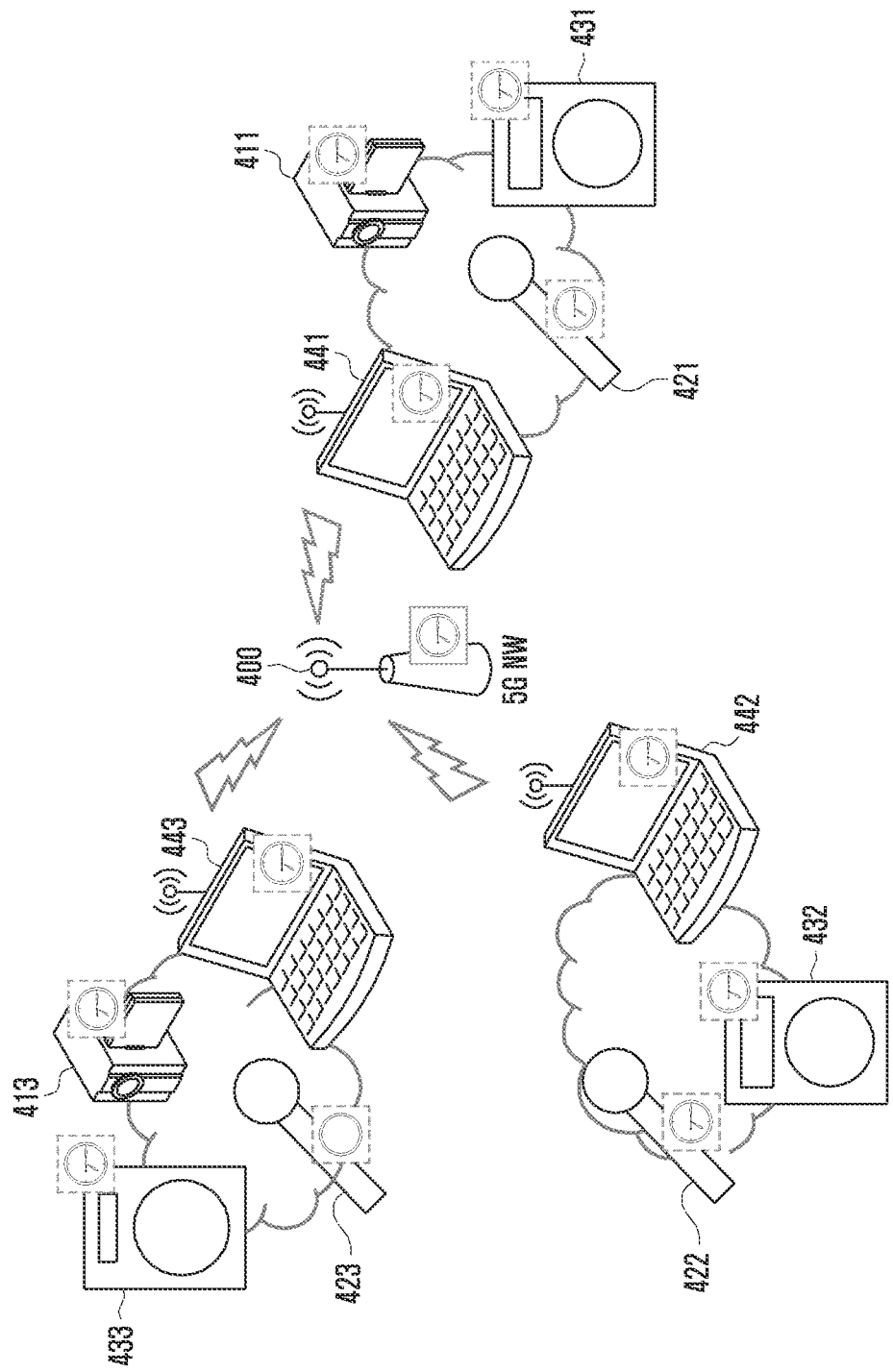
FIG. 5 is a conceptual diagram illustrating VIAPA in which some communication nodes operating as 5G UE/DS-TT can generate a sync message based on a 5GS clock and provide the sync message to an external network of 5GS in a communication system according to an embodiment of the disclosure.

FIG. 5 is a conceptual diagram illustrating VIAPA in which some UEs operating as 5G UE/DS-TT can generate a sync message based on a 5GS clock and provide the sync message to an external network of 5GS in a communication system according to an embodiment of the disclosure.

Referring to FIG. 5, mixing systems 441, 442, and 443 may be 5G UE/DS-TT. Cameras 411 and 413, microphones 421, 422, and 423, and speakers 431, 432, and 433 may be connected to the adjacent mixing systems 441, 442, and 443. Since the mixing systems 441, 442, and 443 operate as the 5G UE/DS-TT, they may receive the sync message from the 5G network 400, and maintain the clock sync with one another. The cameras 411 and 413, the microphones 421, 422, and 423, and the speakers 431, 432, and 433 may receive the sync message from the adjacent mixing systems 441, 442, and 443, and maintain the clock sync with one another. The respective devices 411, 413, 421, 422, 423, 431, 432, and 433 connected to the mixing systems 441, 442, and 443 may support the harmonious performance by adjusting the generation time of videos, audios, and images thereof.

Figure 6:
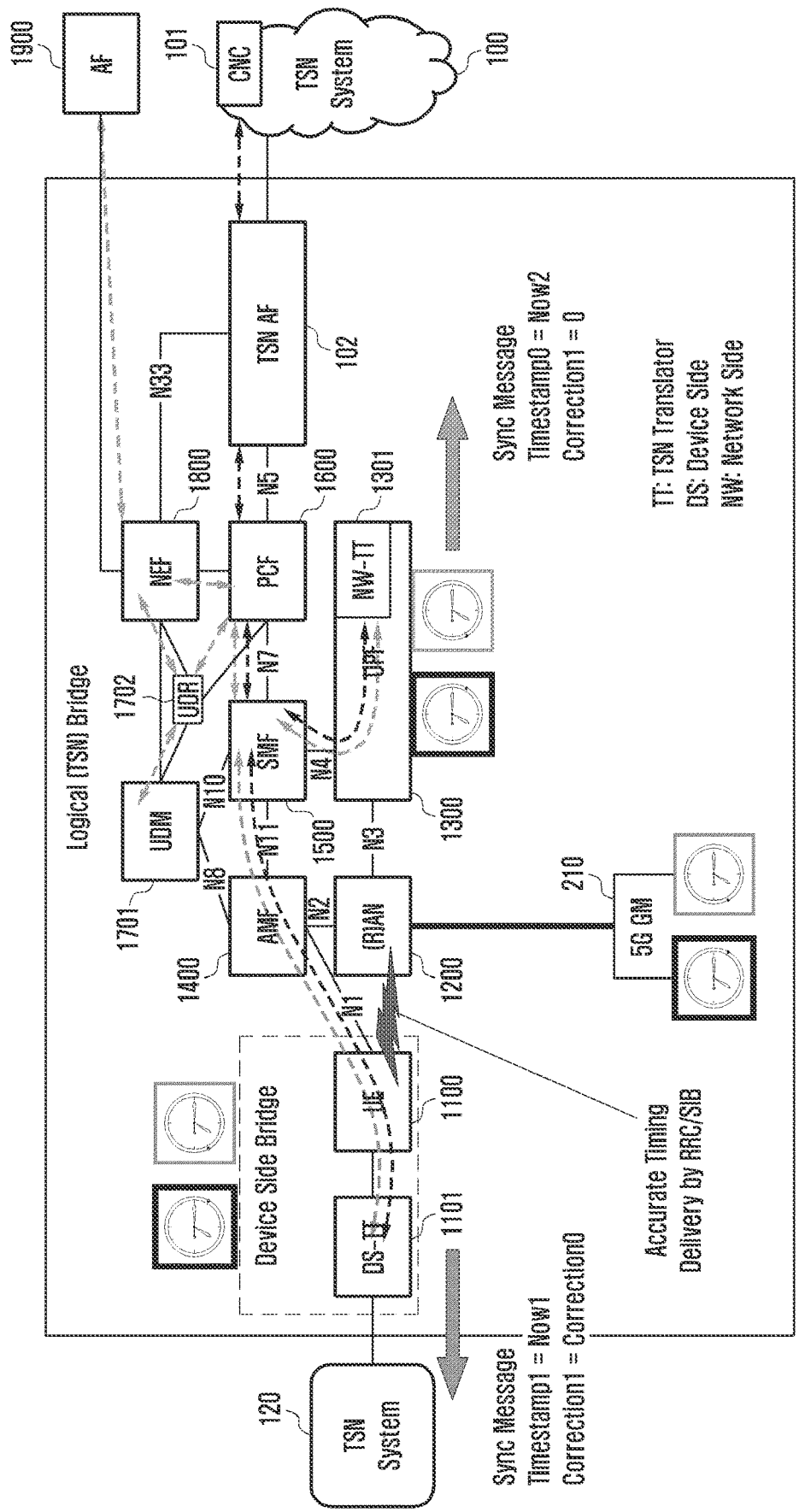
FIG. 6 is a conceptual diagram illustrating a configuration method for configuring a communication node of 5GS as a synchronization source in a communication system according to an embodiment of the disclosure.

FIG. 6 is a conceptual diagram illustrating a configuration method for configuring a communication node of 5GS as a synchronization source in a communication system according to an embodiment of the disclosure.

Referring to FIG. 6, in case that the 5GS interlocks with the TSN system, TSN AF 102 may interlock with a centralized network configuration (CNC) server 101 and exchange management information with the CNC server 101.

According to various embodiments of the disclosure, DS-TT 1101 may be a separate entity that is physically or logically separated from UE 1100. For example, the DS-TT 1101 and the UE 1100 may transmit and receive signals with each other. Further, the DS-TT 1101 may be a physical or logical entity included in the UE 1100. NW-TT 1301 may be a separate entity that is physically or logically separated from UPF 1300. For example, the NW-TT 1301 and the UPF 1300 may transmit and receive signals with each other. Further, the NW-TT 1301 may be a physical or logical entity included in the UPF 1300.

The TSN AF 102 may read management information out of the NW-TT 1301 and the DS-TT 1101. The TSN AF 102 may change the configuration by transmitting the management information to the NW-TT 1301 and the DS-TT 1101.

If there is not the TSN AF 102, the 5GS may interlock with an external application function (AF) 1900 through NEF 1800. In this case, the NEF 1800 may perform a similar function to the function performed by the TSN AF 102. For example, the NEF 1800 may exchange the management information with the NW-TT 1301 and the DS-TT 1101. Further, the NEF 1800 may transmit the 5GS information to the external AF 1900. The NEF 1800 may interlock with SMF 1500, an access and mobility management function (AMF) 1400, PCF 1600, and UDR 1702 in order to apply requirements received from the external AF 1900 to the 5GS system. For example, the NEF 1800 may store necessary information in the UDR 1702, and transmit updated information to UDM 1701 or the PCF 1600 through a notification process.

According to various embodiments of the disclosure, the UDM 1701 and the UDR 1702 may be combined with each other. For example, the UDM 1701 may be called UDR/UDM 1700. The UDR 1702 may be called UDR/UDM 1700.

Figure 7:
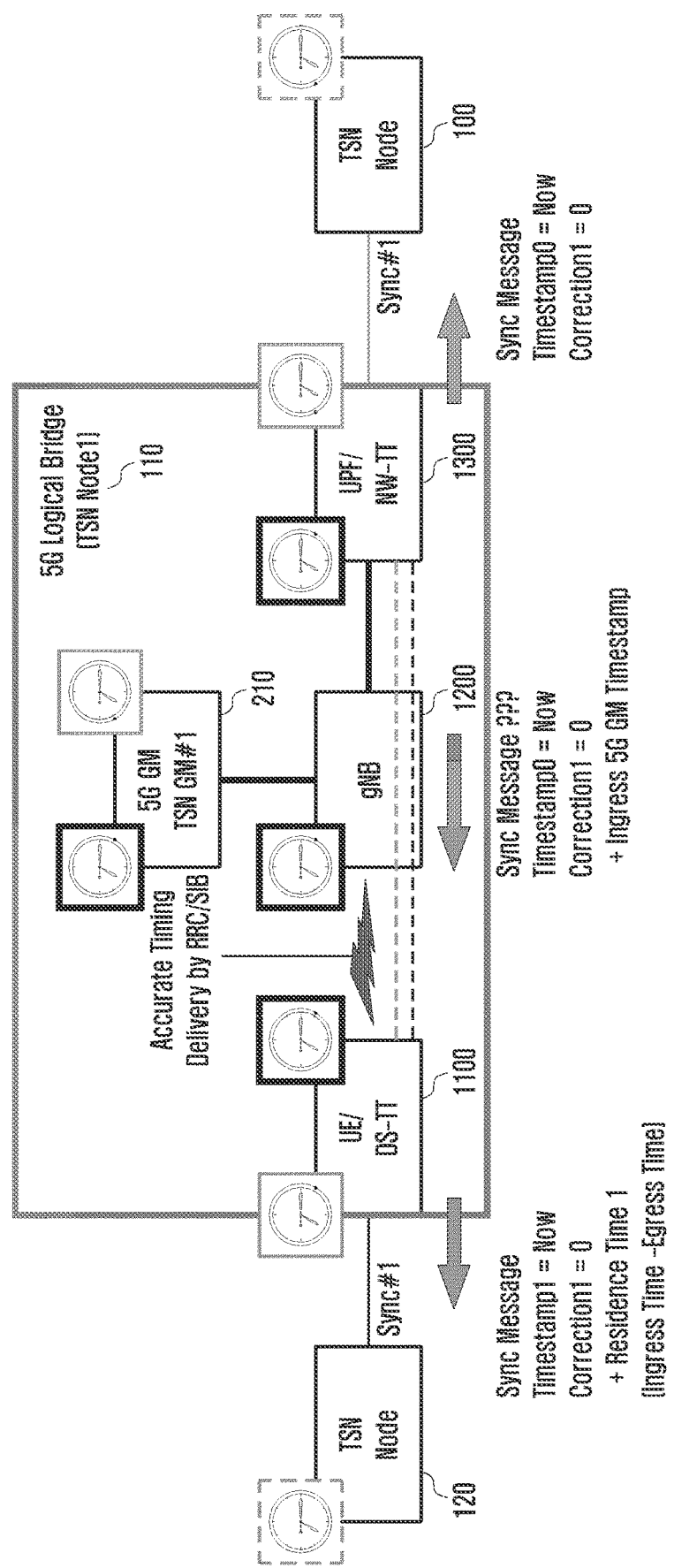
FIG. 7 is a conceptual diagram illustrating a structure in which a network-side TSN translator (NW-TT) generates a sync message and provides sync to an external network of NW-TT and an external network of DS-TT in 5GS in a communication system according to an embodiment of the disclosure.

FIG. 7 is a conceptual diagram illustrating a structure in which NW-TT generates a sync message and provides sync to an external network of NW-TT and an external network of DS-TT in 5GS in a communication system according to an embodiment of the disclosure.

Referring to FIG. 7, UPF/NW-TT 1300 may generate and transmit a sync message in a direction in which wired nodes are connected. In this case, a time stamp of the sync message may indicate the time when the sync message is generated. At the same time, the UPF/NW-TT 1300 may perform a similar operation to the operation of FIG. 3. For example, the UPF/NW-TT 1300 may perform an operation corresponding to the operation of receiving TSN sync (sync message). Other operations of the UPF/NW-TT 1300 may be similar to the operations of FIG. 3. The UPF/NW-TT 1300 may input the time when the sync message arrives into an ingress time field, and transmit the ingress time field to the UE/DS-TT 1100. In this case, the link delay included in the correlation field may be 0. The UE/DS-TT 1100 may determine a residence time that is a time in which the UE/DS-TT 1100 resides in the 5G network using an egress time that is a time when the UE/DS-TT 1100 transmits the sync message out of the 5GS. The UE/DS-TT 1100 may update the correlation field based on the residence time and the link delay, and transmit the sync frame to the next external TSN node 120.

Figure 8:
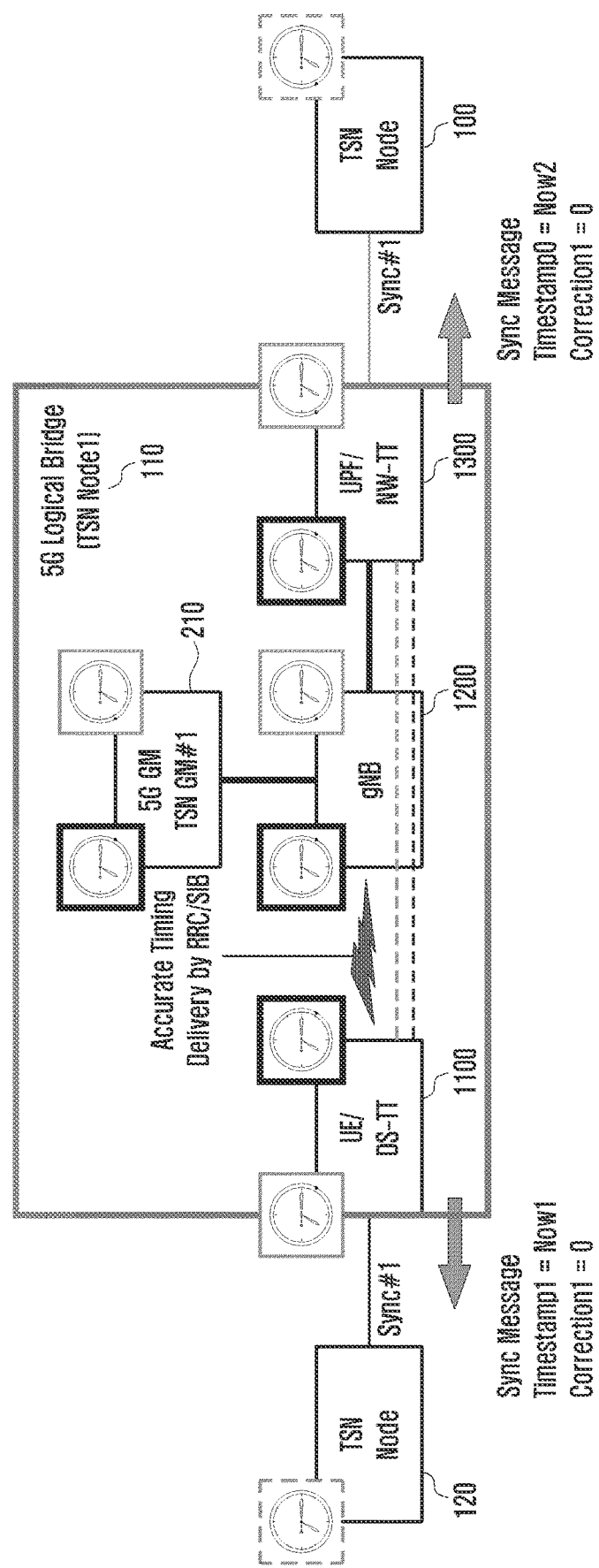
FIG. 8 is a conceptual diagram illustrating a structure in which NW-TT and DS-TT generate a sync message and provide sync to an external network of NW-TT and an external network of DS-TT in 5GS in a communication system according to an embodiment of the disclosure.

FIG. 8 is a conceptual diagram illustrating a structure in which NW-TT and DS-TT generate a sync message and provide sync to an external network of NW-TT and an external network of DS-TT in 5GS in a communication system according to an embodiment of the disclosure.

Referring to FIG. 8, the UPF/NW-TT 1300 may generate and transmit the sync message in a direction in which wired nodes are connected. In this case, the time stamp of the sync message may indicate the time when the sync message is generated. Further, the UE/DS-TT 1100 may generate and transmit the sync message to external nodes connected to the UE/DS-TT 1100. In this case, the time stamp of the sync message may indicate the time when the sync message is generated. The UPF/NW-TT 1300 and the UE/DS-TT 1100 may transmit and receive the sync message in a method that is the same as or similar to the method as described above through FIG. 7. Alternatively, the sync message may not be transmitted. If the sync message is not transmitted, the traffic generation may be reduced, and thus the load of the UE or communication equipment may be reduced and the power consumption may be reduced.

Figure 9:
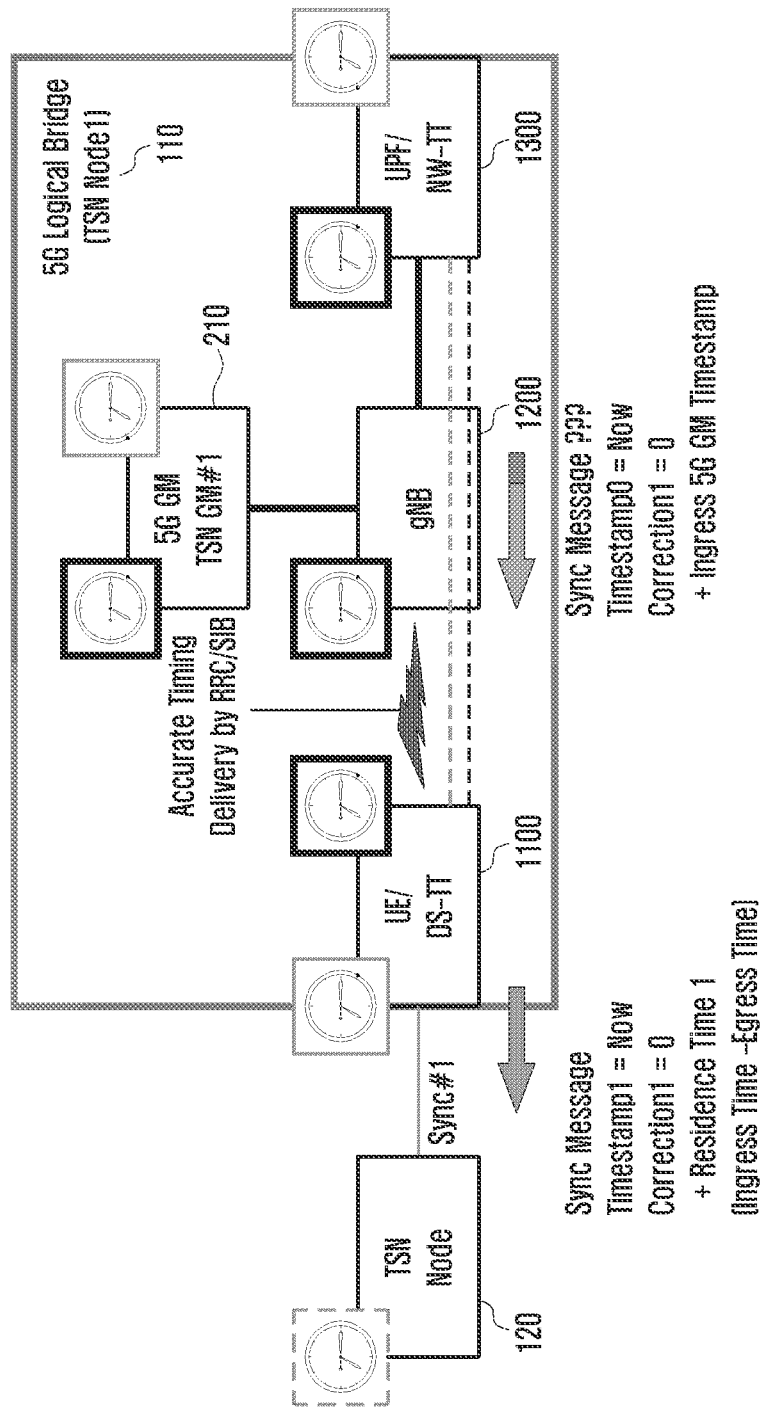
FIG. 9 is a conceptual diagram illustrating a structure in which NW-TT generates a sync message and provides sync to an external network of DS-TT in 5GS in a communication system according to an embodiment of the disclosure.

FIG. 9 is a conceptual diagram illustrating a structure in which NW-TT generates a sync message and provides sync to an external network of DS-TT in 5GS in a communication system according to an embodiment of the disclosure.

Referring to FIG. 9, UPF/NW-TT 1300 may generate the sync message, but may not transmit the sync message in the direction in which the wired nodes are connected. In this case, the time stamp of the sync message may indicate the time when the sync message is generated. At the same time, the UPF/NW-TT 1300 may perform a similar operation to the operation of FIG. 3. For example, the UPF/NW-TT 1300 may perform an operation corresponding to the operation of receiving the TSN sync message. Other operations of the UPF/NW-TT 1300 may be similar to the operations of FIG. 3. The UPF/NW-TT 1300 may input the time when the sync message arrives into the ingress time field, and transmit the ingress time field to the UE/DS-TT 1100. In this case, the link delay included in the correlation field may be 0. The UE/DS-TT 1100 may determine the residence time that is the time in which the UE/DS-TT 1100 resides in the 5G network based on the egress time that is the time when the UE/DS-TT 1100 transmits the sync message out of the 5GS. The UE/DS-TT 1100 may update the correlation field based on the residence time and the link delay, and transmit the sync frame to the next external TSN node 120.

Figure 10:
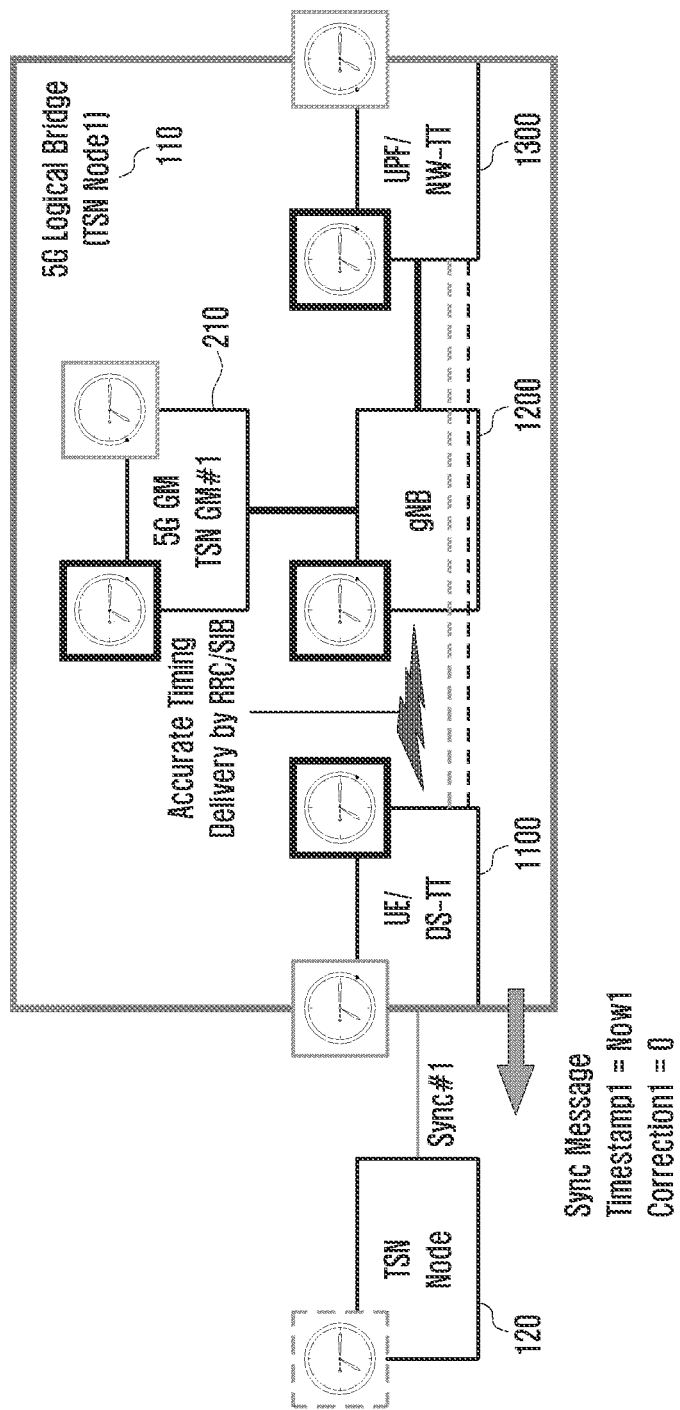
FIG. 10 is a conceptual diagram illustrating a structure in which DS-TT generates a sync message and provides sync to an external network of DS-TT in 5GS in a communication system according to an embodiment of the disclosure.

FIG. 10 is a conceptual diagram illustrating a structure in which DS-TT generates a sync message and provides sync to an external network of DS-TT in 5GS in a communication system according to an embodiment of the disclosure.

Referring to FIG. 10, the UE/DS-TT 1100 may generate and transmit the sync message to the external nodes connected to the UE/DS-TT 1100. In this case, the time stamp of the sync message may indicate the time when the sync message is generated. The UPF/NW-TT 1300 may not generate the sync message. Further, the UPF/NW-TT 1300 may generate the sync message, but may not transmit the sync message in the direction in which the wired nodes are connected. In this case, the time stamp of the sync message may indicate the time when the sync message is generated. The UPF/NW-TT 1300 and the UE/DS-TT 1100 may not transmit the sync message with each other in the method described above with reference to FIG. 9. If the sync message is not transmitted, the traffic generation may be reduced, and thus the load of the UE or communication equipment may be reduced, and the power consumption may be reduced. The TSN AF 102 or the NEF 1800 may be configured to operate the UE/DS-TT 1100 as the GM master 210. The UPF/NW-TT 1300 may be configured in a passive or disabled state.

Figure 11:
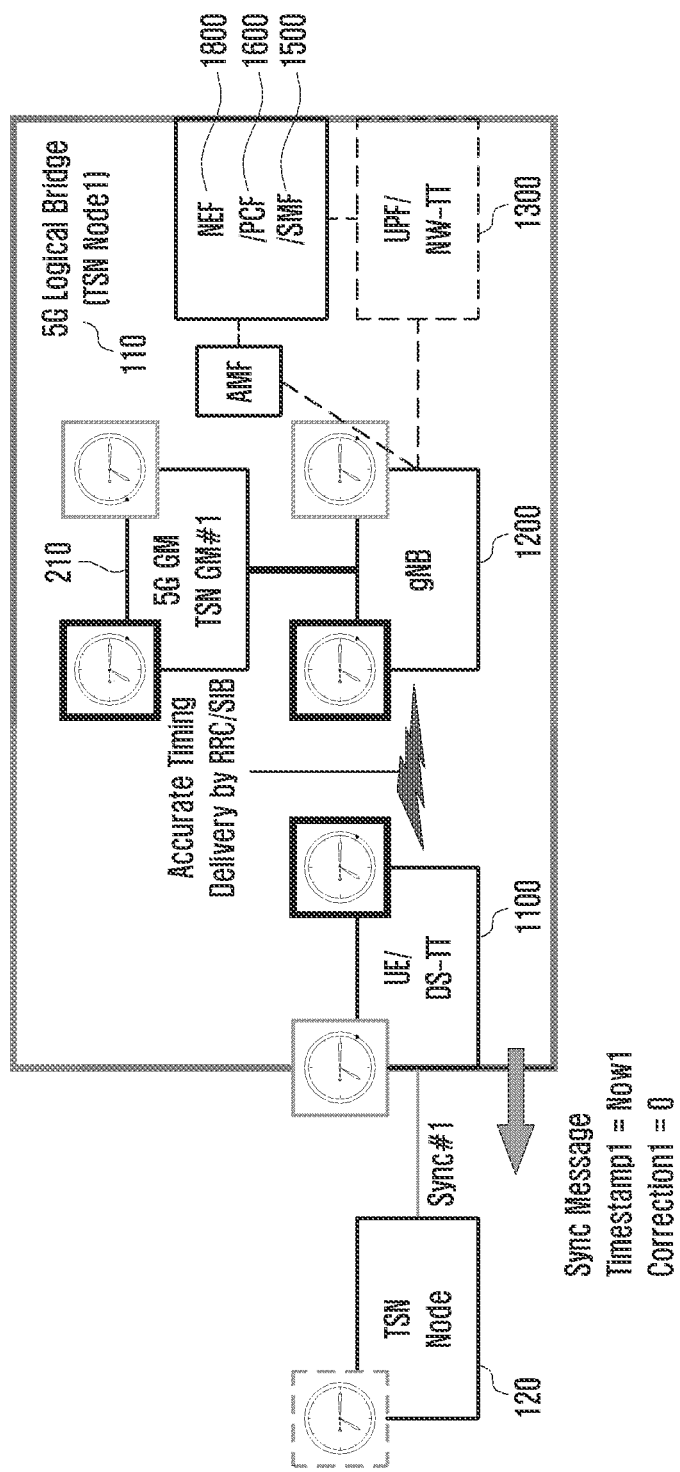
FIG. 11 is a conceptual diagram illustrating a structure in which DS-TT generates a sync message and provides sync to an external network of DS-TT by using a PDU session that utilizes a control plane using a logical user plane function (UPF) in 5GS in a communication system according to an embodiment of the disclosure.

FIG. 11 is a conceptual diagram illustrating a structure in which DS-TT generates a sync message and provides sync to an external network of DS-TT by using a PDU session that utilizes a control plane using a logical UPF in 5GS in a communication system according to an embodiment of the disclosure.

Referring to FIG. 11, the UE/DS-TT 1100 may generate and transmit the sync message to the external nodes connected to the UE/DS-TT 1100. In this case, the time stamp of the sync message may indicate the time when the sync message is generated. By using the PDU session using the control plane, the logical UPF 1300 may be allocated. The logical NW-TT 1301 may be allocated to the UPF 1300. However, the NW-TT 1301 may not generate the sync message, and may not transmit the sync message in the direction in which the wired nodes are connected. The NW-TT 1301 and the DS-TT 1101 may not transmit the sync message with each other in the method described above with reference to FIG. 7 or 9. Since the sync message is not transmitted, the traffic generation may be reduced, and thus the load of the UE or network entity may be reduced, and the power consumption may be reduced. In this case, a PDU session that utilizes a control plane using the logical UPF 1300 is used, and the TSN AF 102 or the NEF 1800 may be configured to operate the DS-TT(1101) as the GM master 201. The NW-TT 1301 of the logical UPF 1300 may be configured to be in a passive or disabled state. In this case, the TSN AF 102 or the NEF 1800 may configure the logical UPF 1300 or the NW-TT 1301.

Figure 12:
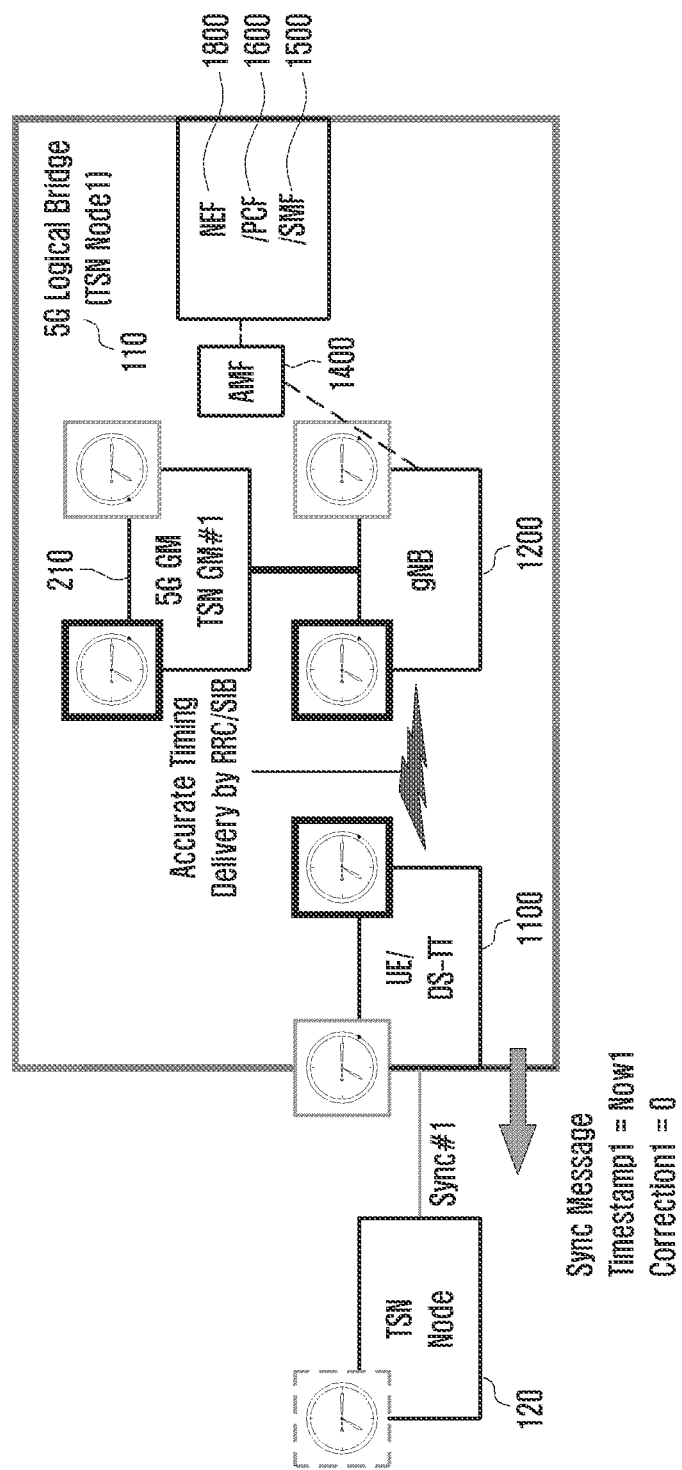
FIG. 12 is a conceptual diagram illustrating a structure in which DS-TT generates a sync message and provides sync to an external network of DS-TT by using a PDU session that utilizes a control plane using an access and mobility management function (NEF) in 5GS in a communication system according to an embodiment of the disclosure.

FIG. 12 is a conceptual diagram illustrating a structure in which DS-TT generates a sync message and provides sync to an external network of DS-TT by using a PDU session that utilizes a control plane using an NEF in 5GS in a communication system according to an embodiment of the disclosure.

Referring to FIG. 12, the DS-TT 1101 may generate and transmit the sync message to the external nodes 120 connected to the DS-TT 1101. In this case, the time stamp of the sync message may indicate the time when the sync message is generated. By using the PDU session using the control plane, the logical UPF 1300 may be allocated. The logical NW-TT 1301 may be allocated to the UPF 1300. However, the NW-TT 1301 may not generate the sync message, and may not transmit the sync message in the direction in which the wired nodes are connected. The NW-TT 1301 and the DS-TT 1101 may not transmit the sync message with each other in the method described above with reference to FIG. 7 or 9. Since the sync message is not transmitted, the traffic generation may be reduced, and thus the load of the UE or network entity may be reduced, and the power consumption may be reduced. In this case, by using the PDU session that utilizes the control plane using the NEF 1800, the TSN AF 102 or the NEF 1800 may be configured to operate the DS-TT(1101) as the GM master 201. Since there is not the UPF 1300, the allocation of the 5GS bridge ID or the state of the NW-TT 1301 may be managed by the TSN AF 102 or the NEF 1800.

Figure 13:
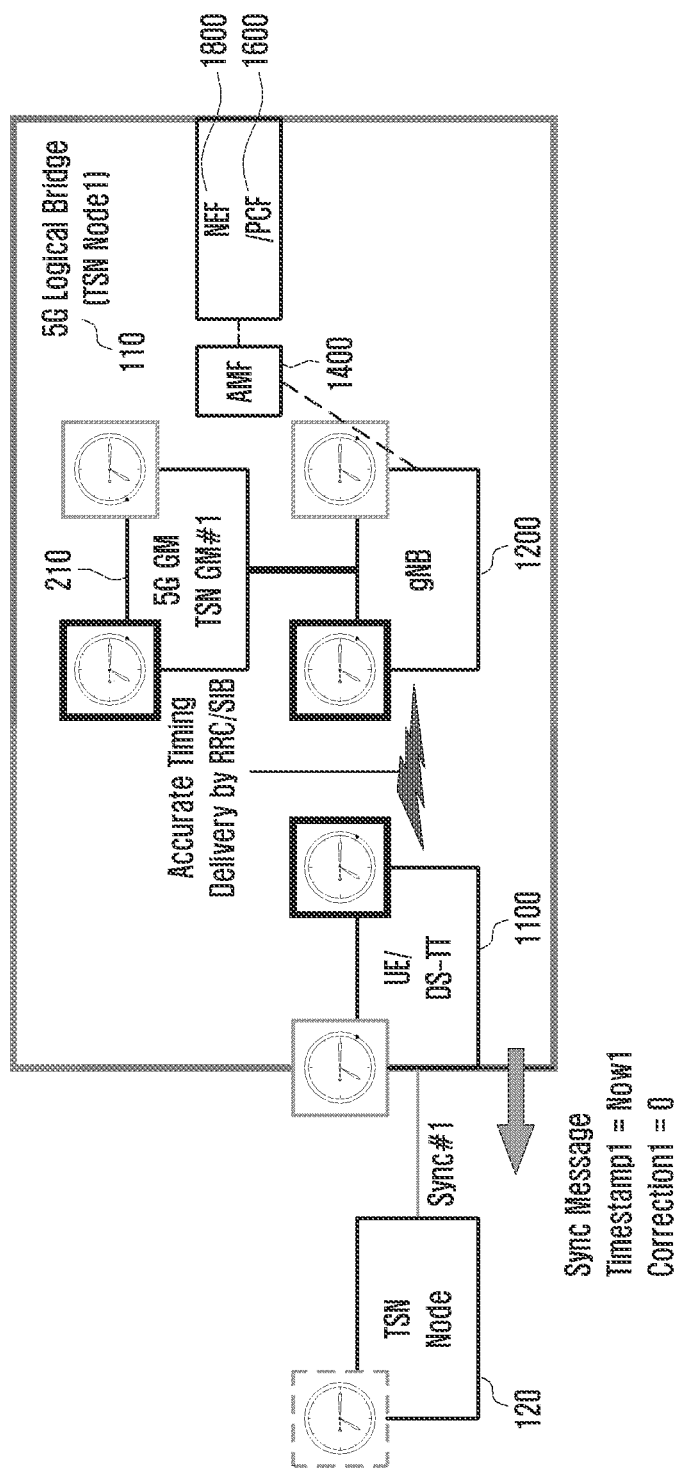
FIG. 13 is a conceptual diagram illustrating a structure in which DS-TT generates a sync message and provides sync to an external network of DS-TT without a PDU session in 5GS in a communication system according to an embodiment of the disclosure.

FIG. 13 is a conceptual diagram illustrating a structure in which DS-TT generates a sync message and provides sync to an external network of DS-TT without a PDU session in 5GS in a communication system according to an embodiment of the disclosure.

Referring to FIG. 13, the UE/DS-TT 1100 may generate and transmit the sync message to the external nodes 120 connected to the UE/DS-TT 1100. In this case, the time stamp of the sync message may indicate the time when the sync message is generated. In this case, the UE/DS-TT 1100 can be only registered in the 5G system in a state where there is not the PDU session. The NW-TT 1301 and the UE 1100 or the DS-TT 1101 may not transmit the sync message with each other in the method described above with reference to FIG. 7 or 9. Since the sync message is not transmitted, the traffic generation may be reduced, and thus the load of the UE or network entity may be reduced, and the power consumption may be reduced. In this case, since there is not the UPF 1300, the allocation of the 5GS bridge ID or the state of the NW-TT 1301 may be managed by the TSN AF 102 or the NEF 1800.

Figure 14:
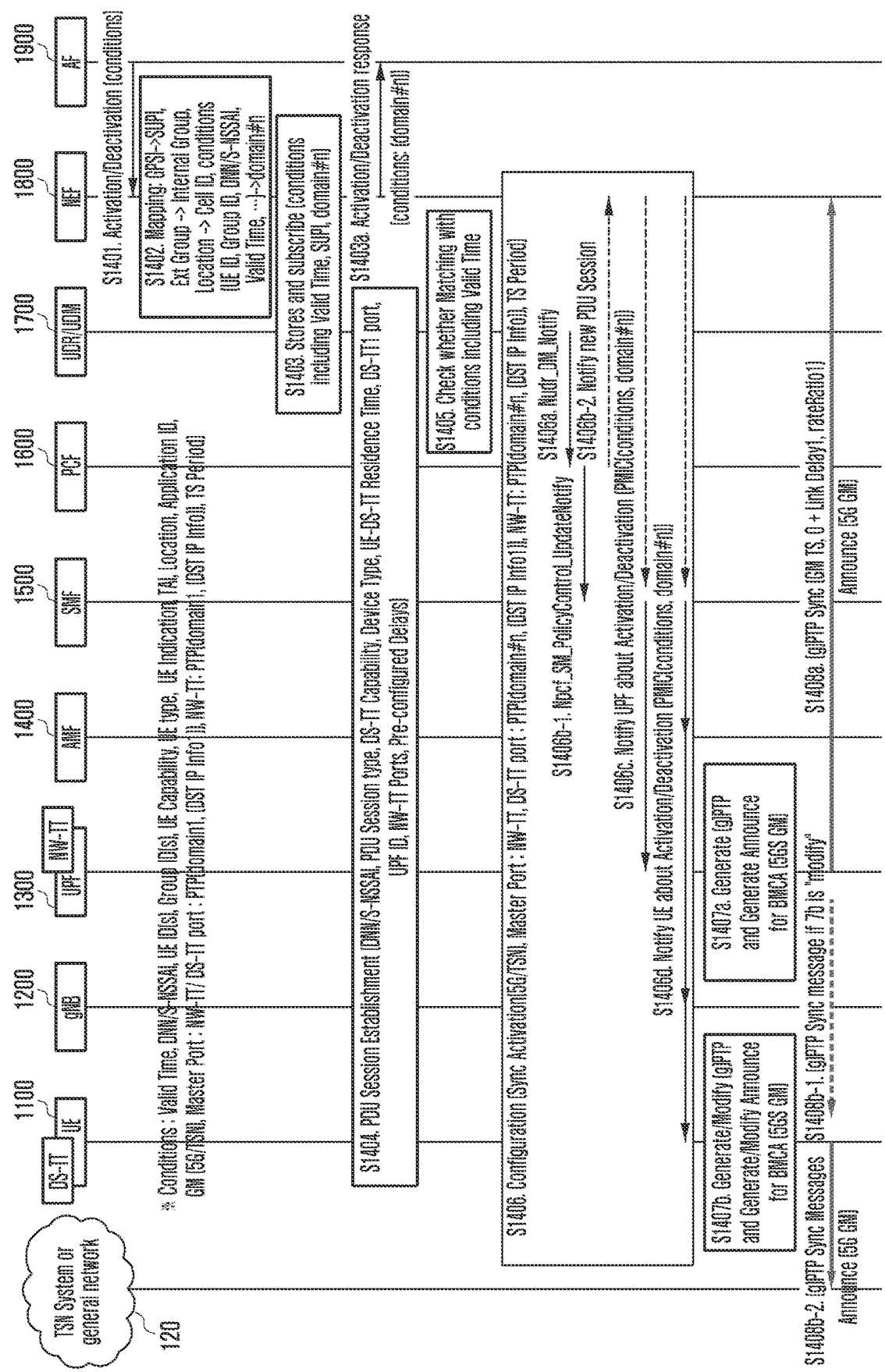
FIG. 14 is a flowchart illustrating an embodiment of utilizing a unified data repository (UDR) notification in case that NW-TT or NW-TT and DS-TT generate a sync message and provide sync to an external network of NW-TT and an external network of DS-TT in 5GS in a communication system according to an embodiment of the disclosure.

FIG. 14 is a flowchart illustrating an embodiment of utilizing an UDR notification in case that NW-TT or NW-TT and DS-TT generate a sync message and provide sync to an external network of NW-TT and an external network of DS-TT in 5GS in a communication system according to an embodiment of the disclosure.

This embodiment may correspond to a case of using the structure of FIG. 7 or 8.

Referring to FIG. 14, at operation S1401, the AF 1900 may transmit an activation/deactivation request of a 5GS sync service to the NEF 1800. In this case, added conditions may include the following contents.

Valid time: Valid period of the request and the like

Data network name (DNN)/single-network slice selection assistance information (S-NSSAI): Data network name and network slice (Network Slice_ID) of a protocol data unit (PDU) session UE ID(s): Target UE ID (generic public subscription identifier (GPSI) or others) and the like Group ID(s): External group ID designated by AF and the like UE capability: Sync support, DS-TT support, DS-TT GM support, sync generation support, and the like UE type: Sync UE, TSC and IoT UE, and the like UE indication: Indication indicating that the sync service is necessary, and the like Tracking area identity (TAI): Location on the 5G system of cell ID based target UE Location: Physical location of UE Application ID: Application ID requested by AF GM: Denoting whether to use a 5G GM or an external TSN GM Master port: NW-TT/DS-TT port Sync message format: gPTP/PTP Sync domain: Domain 1 (domain1) (time sync domain that may be omitted)

DST IP information 1 (Info1): IP address of an external node that becomes a target when a PTP message is used Sync accuracy: Time stamp period or granularity At operation S1402, the NEF 1800 may convert some of conditions received at operation S1401. The generic public subscription identifier (GPSI) may be converted into an international mobile subscriber identity (IMSI) being used inside the 5GS. The external group ID may be converted into the internal group ID being used inside the 5GS. The sync clock domain provided from the AF 1900 may be converted by the NEF 1800. The NEF 1800 may separately allocate a domain number (domain #n) to a combination of various conditions, such as UE ID, group ID, DNN/S-NSSAI, and valid time. When the AF 1900 requests activation of the sync based on the 5G GM clock 201, it may specify or may not specify the separate domain. The NEF 1800 having received the request may separately allocate the domain number (domain #n) so that the domain number does not collide with the domain ID already allocated to the 5GS bridge.

At operation 1403, the NEF 1800 may store conditions including a valid time, subscription permanent identifier (SUPI), domain number (domain #n), and the like in the unified data repository (UDR), and if needed, it may notify the unified data management (UDM) 1700 of the UDR, or may transmit the notification to the policy control function (PCF) 1600 later.

At operation S1403a, the NEF 1800 may transmit, to the AF 1900, a response notifying that the requested contents including the converted domain number (domain #n) have been reflected in the 5GS.

At operation S1404, the UE/DS-TT 1100 may transmit a PDU session request to the SMF 1500. The request may include conditions, such as DNN/S-NSSAI, PDU session type, DS-TT capability, device type, and the like. The SMF 1500 may determine whether to proceed with a later PDU session process by obtaining and comparing subscriber information from the UDM 1700. If it is determined to continue the proceeding, The SMF 1500 may register the corresponding PDU session in the UDM 1700. Further, in accordance with the request, a policy session between the SMF 1500 and the PCF 1600 may be configured.

At operation S1405, the UDR 1700 may determine whether the conditions including the valid time match one another based on the information transferred through the UDM 1700 when the PDU session is registered.

At operation S1406, sync activation may be performed to match the matching conditions. For example, at operation S1406a, the UDR 1700 may transmit the notification to the PCF 1600. At operation S1406b-1, the PCF 1600 may notify the SMF 1500 that the policy has been updated. At operation S1406b-2, the PCF 1600 may notify the NEF 1800 that a new PDU session has been generated. The NEF 1800 may receive necessary information about the new PDU session from the DS-TT 1100/NW-TT 1300. According to another embodiment of the disclosure, the operation S1406b-2 may be omitted. At operation S1406c, the SMF 1500 may transmit a sync activation request to the UPF/NW-TT 1300. In this case, a bridge management information container (BMIC) or a port management information container (PMIC) for the domain number (domain #n) may be used. If it is determined that the NEF 1800 directly transmits the information to the new PDU session at operation S1406b-2, the process may be the process in which the information transferred by the NEF 1800 to the SMF 1500 through the PCF 1600 is transferred by the SMF 1500. At operation S1406d, the SMF 1500 may transmit the sync activation request to the UE/DS-TT 1100. In this case, the PMIC for the domain number (domain #n) may be used. If it is determined that the NEF 1800 directly transmits the information to the new PDU session at operation S1406b-2, the process may be the process in which the information transmitted by the NEF 1800 to the SMF 1500 through the PCF 1600 is transmitted by the SMF 1500.

At operation S1407a, the UPF/NW-TT 1300 may generate and transmit the sync message based on the 5G GM clock to an outside of the NW-TT 1300 in accordance with the conditions configured at operation S1406. In this case, the time stamp of the sync message may indicate the time when the sync message is generated. The domain may be configured as the domain number (domain #n) allocated from the NEF 1800. At the same time, the NW-TT 1300 may perform an operation corresponding to the operation of receiving the TSN sync message as shown in FIG. 3. The NW-TT 1300 may input the time when the sync message arrives into the ingress time field, and transmit the ingress time field to the DS-TT 1100. Since the time generated based on the same 5G GM clock 201 is the arrival time, the ingress time field may have the same value. Alternatively, the ingress time field may be omitted. In this case, the link delay included in the correlation field of the sync message may be 0.

At operation S1407a, the UPF/NW-TT 1300 may operate in accordance with the conditions configured at operation S1406. The NW-TT 1300 and the DS-TT 1100 may transmit and receive the sync message with each other in the method as described above with reference to FIG. 7. Alternatively, the sync message may not be transmitted. If the sync message is not transmitted, the traffic generation may be reduced, and thus the load of the UE or network entity may be reduced, and the power consumption may be reduced.

At operation S1407a, the UPF/NW-TT 1300 may be the subject that transmits the sync to the outside. Accordingly, the UPF/NW-TT 1300 may be configured to periodically transmit an announce message for the best master clock algorithm (BMCA) based on the 5G GM clock having a master port status.

At operation S1407b, the DS-TT 1100 may determine the residence time that is the time in which the DS-TT 1100 resides in the 5G network using the egress time that is the time when the sync message transmitted by the NW-TT at operation S1407a is transmitted to the outside of the 5GS. The UE/DS-TT may transmit the sync frame to the next external TSN node by updating the correlation field based on the residence time and the link delay.

In accordance with the conditions configured at operation S1406, the DS-TT 1100, at operation S1407b, may generate and transmit the sync message to the external nodes connected to the DS-TT 1100. In this case, the time stamp of the sync message may indicate the time when the sync message is generated. The NW-TT 1300 and the DS-TT 1100 may transmit the sync message to each other in the method described above with reference to FIG. 7. Alternatively, the sync message may not be transmitted. If the sync message is not transmitted, the traffic generation may be reduced, and thus the load of the UE or network entity may be reduced, and the power consumption may be reduced.

At operation S1407b, the UE/DS-TT 1100 is the subject that transmits the sync to the outside. Accordingly, the UE/DS-TT 1100 may be configured to periodically transmit the announce message for the BMCA based on the 5G GM clock 201 having the master port status.

At operation S1408a, the NW-TT 1300 may transmit the sync message and the announce message to an external node based on the configuration at operation S1407a.

At operation S1408b-1, the NW-TT 1300 may transmit the sync message to the DS-TT 1100 based on the configuration at operation S1407a.

At operation S1408b-2, the UE/DS-TT 1100 may transmit the sync message and the announce message to the outside based on the configuration at operation S1407b.

Figure 15:
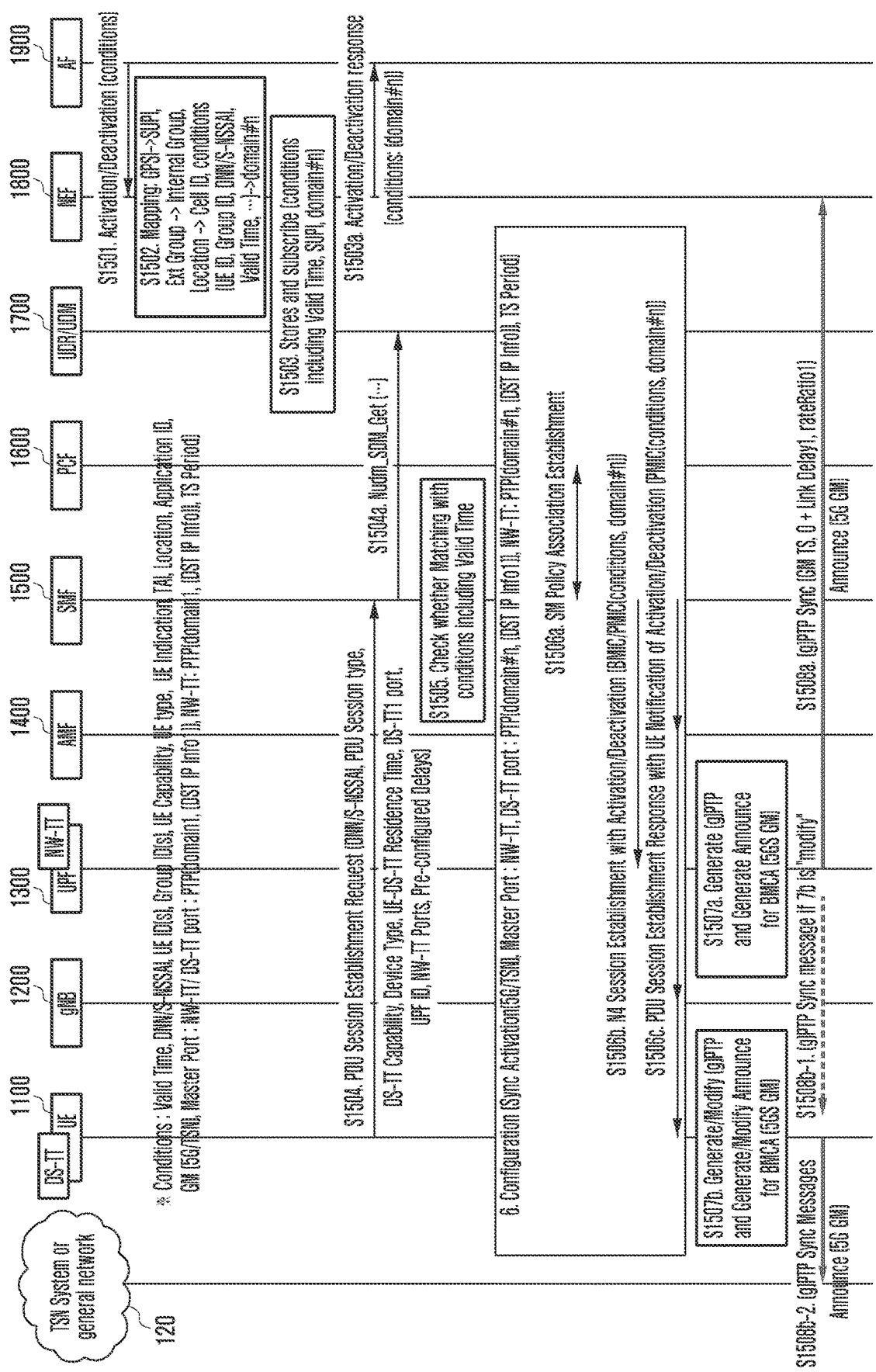
FIG. 15 is a flowchart illustrating an embodiment of utilizing a PDU session response in case that NW-TT or NW-TT and DS-TT generate a sync message and provide sync to an external network of NW-TT and an external network of DS-TT in 5GS in a communication system according to an embodiment of the disclosure.

FIG. 15 is a flowchart illustrating an embodiment of utilizing a PDU session response in case that NW-TT or NW-TT and DS-TT generate a sync message and provide sync to an external network of NW-TT and an external network of DS-TT in 5GS in a communication system according to an embodiment of the disclosure.

This embodiment may correspond to a case of using the structure of FIG. 7 or 8.

Referring to FIG. 15, operation S1501 may be the same as or similar to operation S1401 of FIG. 14.

Operation S1502 may be the same as or similar to operation S1402 of FIG. 14.

Operation S1503 may be the same as or similar to operation S1403 of FIG. 14.

Operation S1503a may be the same as or similar to operation S1403a of FIG. 14.

At operation S1504, the UE/DS-TT 1100 may transmit a PDU session request to the SMF 1500. The request may include conditions, such as DNN/S-NSSAI, PDU session type, capability of the DS-TT 1100, device type, and the like. At operation S1504a, the SMF 1500 may receive subscription information from the UDM 1700.

At operation S1505, the SMF 1500 may determine whether a PDU session establishment request matches the conditions including the valid time.

At operation S1506, the SMF 1500 may perform the sync activation based on the matching conditions. For example, at operation 1506a, the SMF 1500 may perform policy association with the PCF 1600. At operation S1506b, the SMF 1500 may transmit the sync activation request to the UPF/NW-TT 1100. In this case, the SMF 1500 may use the bridge management information container (BMIC) or the port management information container (PMIC) for the domain number (domain #n). At operation S1506c, the SMF 1500 may transmit the sync activation request to the UE/DS-TT. In this case, the SMF 1500 may use the PMIC for the domain number (domain #n).

Operation S1507a may be the same as or similar to operation S1407a of FIG. 14.

Operation S1507b may be the same as or similar to operation S1407b of FIG. 14.

Operation S1508a may be the same as or similar to operation S1408a of FIG. 14.

Operation S1508b-1 may be the same as or similar to operation S1408b-1 of FIG. 14.

Operation S1508b-2 may be the same as or similar to operation S1408b-2 of FIG. 14.

Figure 16:
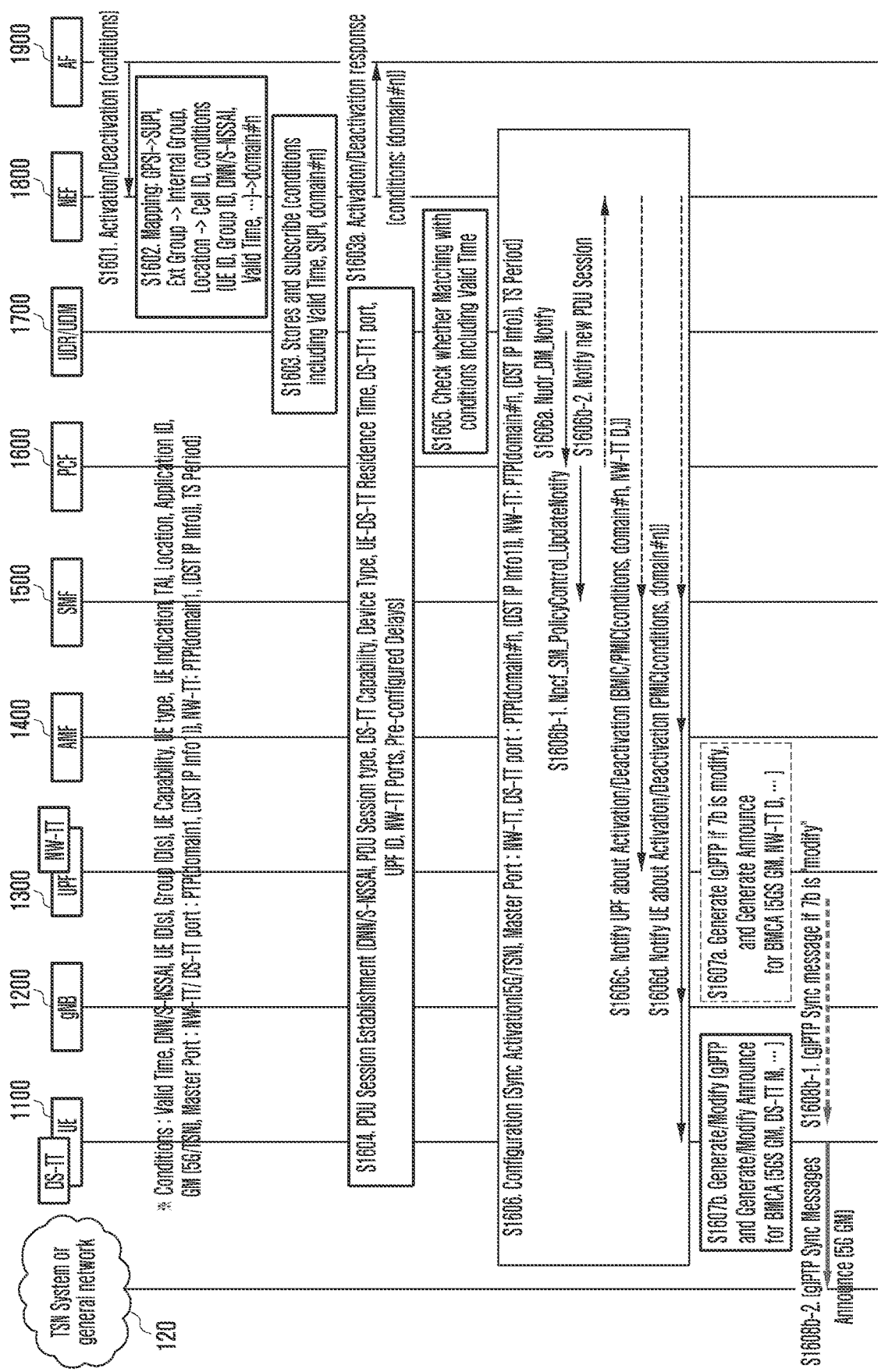
FIG. 16 is a flowchart illustrating an embodiment of utilizing a UDR notification in case that NW-TT or DS-TT generates a sync message and provides sync to an external network of DS-TT in 5GS in a communication system according to an embodiment of the disclosure.

FIG. 16 is a flowchart illustrating an embodiment of utilizing a UDR notification in case that NW-TT or DS-TT generates a sync message and provides sync to an external network of DS-TT in 5GS in a communication system according to an embodiment of the disclosure.

This embodiment may correspond to a case of using the structure of FIG. 9 or 10.

Referring to FIG. 16, at operation S1601, the AF may transmit an activation/deactivation request of a 5GS sync service to the NEF. In this case, added conditions may include the following contents.

Valid time: Valid period of the request and the like
DNN/S-NSSAI: Data network name and network slice ID of a PDU session
UE ID(s): Target UE ID (GPSI or others) and the like
Group ID(s): External group ID designated by AF and the like
UE capability: Sync support, DS-TT support, DS-TT GM support, sync generation support, and the like
UE type: Sync UE, TSC and IoT UE, and the like
UE indication: Indication indicating that the sync service is necessary, and the like
TAI: Location on the 5G system of cell ID based target UE
Location: Physical location of UE
Application ID: Application ID requested by AF
GM: Denoting whether to use a 5G GM or an external TSN GM
Master port: NW-TT/DS-TT port
Sync message format: gPTP/PTP
Sync domain: domain1 (time sync domain that may be omitted)
DST IP Info1: IP address of an external node that becomes a target when a PTP message is used
Sync accuracy: Time stamp period or granularity At operation S1602, the NEF may convert some information of conditions received at operation S1601. The GPSI may be converted into an IMSI being used inside the 5GS. The external group ID may be converted into the internal group ID being used inside the 5GS. The sync clock domain provided from the AF 1900 may be converted by the NEF 1800. The NEF 1800 may separately allocate a domain number (domain #n) to a combination of various conditions, such as UE ID, group ID, DNN/S-NSSAI, and valid time. When the AF 1900 requests activation of the sync based on the 5G GM clock 200, it may specify or may not specify the separate domain. The NEF 1800 having received the request may separately allocate the domain number (domain #n) so that the domain number does not collide with the domain ID already allocated to the 5GS bridge.

At operation 1603, the NEF 1800 may store conditions including a valid time, SUPI, domain number (domain #n), and the like in the UDR 1700, and if needed, it may notify the UDM 1700 of the UDR 1700, or may transmit the notification to the PCF 1600 later.

At operation S1603a, the NEF 1800 may transmit, to the AF, a response notifying that the requested contents including the converted domain number (domain #n) have been reflected in the 5GS.

At operation S1604, the UE/DS-TT 1100 may transmit a PDU session request to the SMF 1500. The request may include conditions, such as DNN/S-NSSAI, PDU session type, capability of the DS-TT 1100, device type, and the like. The SMF 1500 may determine whether to proceed with a later PDU session process by obtaining subscriber information from the UDM 1700 and comparing the subscriber information with the above-described conditions. If it is determined to proceed with the PDU session process, The SMF 1500 may register the corresponding PDU session in the UDM 1700. Further, in accordance with the request, the SMF 1500 may configure a policy session between the SMF 1500 and the PCF 1600.

At operation S1605, the UDR 1700 may determine whether the conditions including the valid time match one another based on the information transferred through the UDM 1700 when the SMF 1500 registers the PDU session.

At operation S1606, sync activation may be performed based on the matching conditions. For example, at operation S1606a, the UDR 1700 may transmit the notification to the PCF 1600. At operation S1606b-1, the PCF 1600 may notify the SMF 1500 that the policy has been updated. At operation S1606b-2, the PCF 1600 may notify the NEF 1800 that a new PDU session has been generated. The NEF 1800 may obtain necessary information about the new PDU session from the DS-TT 1100/NW-TT 1300. Operation S1606b-2 may be omitted. At operation S1606c, the SMF 1500 may transmit a sync activation request to the UPF/NW-TT 1100. In this case, the SMF 1500 may use a bridge management information container (BMIC) or a port management information container (PMIC) for the domain number (domain #n). In this case, since the port status of the NW-TT 1300 is configured to be disable, the sync message may not be transferred to an outside of the NW-TT 1300. If the NEF 1800 directly transfers the information to the new PDU session at operation S1606b-2, the process may be the process in which the SMF 1500 retransfers the information that the NEF 1800 has transferred to the SMF 1500 through the PCF 1600 to the UPF/NW-TT 1100. At operation S1606d, the SMF 1500 may transmit the sync activation request to the UE/DS-TT 1100. In this case, the SMF 1500 may use the PMIC for the domain number (domain #n). If the NEF 1800 directly transfers the information to the new PDU session at operation S1606b-2, the process may be the process in which the SMF 1500 retransfers the information that the NEF 1800 has transferred to the SMF 1500 through the PCF 1600 to the UE/DS-TT 1100.

At operation S1607a, the UPF/NW-TT 1300 may generate the sync message based on the 5G GM clock 210 based on the conditions configured at operation S1606, but may not transfer the sync message to an outside of the NW-TT 1300. In this case, the time stamp of the sync message may indicate the time when the sync message is generated. The domain may be configured as the domain number (domain #n) allocated from the NEF 1800. At the same time, the NW-TT 1300 may perform an operation corresponding to the operation of receiving the TSN sync message as shown in FIG. 3. For example, the NW-TT 1300 may input the time when the sync message arrives into the ingress time field, and transmit the ingress time field to the DS-TT 1100. Since the time generated based on the same 5G GM clock 210 is the arrival time, the same value may be inputted. The ingress time field may be omitted. In this case, the link delay included in the correlation field of the sync message may be 0.

At operation S1607a, the UPF/NW-TT 1300 may operate based on the conditions configured at operation S1606. For example, the NW-TT 1300 and the DS-TT 1100 may transmit and receive the sync message with each other in the method as described above with reference to FIG. 7. Alternatively, the sync message may not be transmitted. If the sync message is not transmitted, the traffic generation may be reduced, and thus the load of the UE or network entity may be reduced, and the power consumption may be reduced.

At operation S1607a, since the UPF/NW-TT 1300 may be the subject that transmits the sync to the outside, it may be configured to periodically transmit an announce message for the BMCA based on the 5G GM clock 210 having a master port status.

At operation S1607b, the DS-TT 1100 may determine the residence time that is the time in which the DS-TT 1100 resides in the 5G network using the egress time that is the time when the sync message received from the NW-TT 1300 at operation S1607a is transmitted to the outside of the 5GS. The UE/DS-TT 1100 may transmit the sync frame to the next external TSN node by updating the correlation field based on the residence time and the link delay.

Based on the configuration conditions at operation S1606, the DS-TT 1100, at operation S1607b, may generate and transmit the sync message to the external nodes connected to the DS-TT 1100. In this case, the time stamp of the sync message may indicate the time when the time stamp of the sync message is generated. NW-TT 1300 and the DS-TT 1100 may transmit the sync message with each other in the method described above with reference to FIG. 7. Alternatively, the sync message may not be transmitted. If the sync message is not transmitted, the traffic generation may be reduced, and thus the load of the UE or network entity may be reduced, and the power consumption may be reduced.

At operation S1607b, since the UE/DS-TT 1100 is the subject that transmits the sync to the outside, it may be configured to periodically transmit the announce message for the BMCA based on the 5G GM clock 210 having the master port status.

At operation S1608a, the NW-TT 1300 may transmit the sync message and the announce message to an external node as configured at operation S1607a.

At operation S1608b-1, the NW-TT 1300 may transmit the sync message to the DS-TT 1100 as configure at operation S1607a.

At operation S1608b-2, the UE/DS-TT 1100 may transmit the sync message and the announce message to the outside as configured at operation S1607b.

Figure 17:
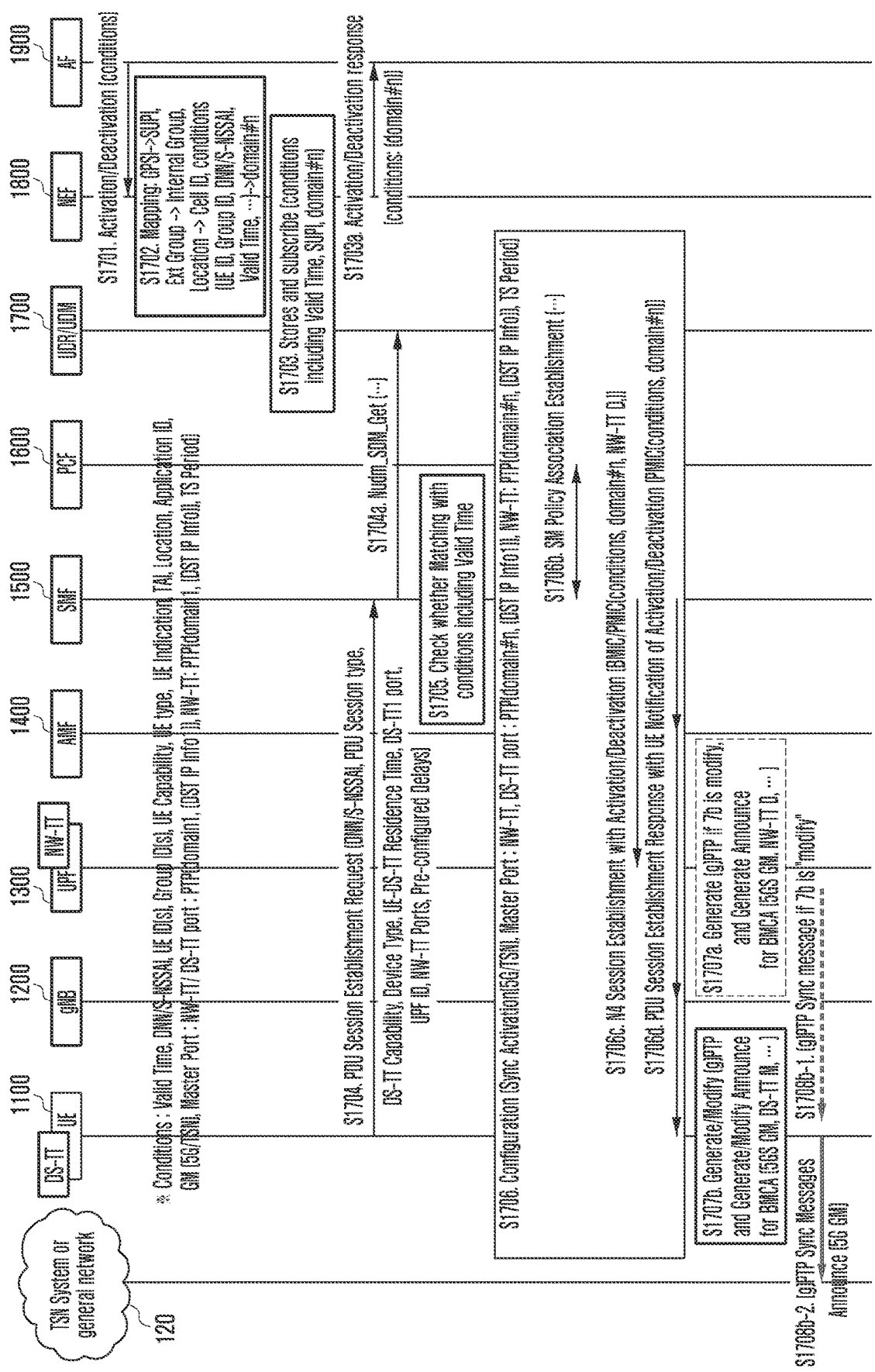
FIG. 17 is a conceptual diagram illustrating an embodiment of utilizing a PDU session response in case that NW-TT or DS-TT generates a sync message and provides sync to an external network of DS-TT in 5GS in a communication system according to an embodiment of the disclosure.

FIG. 17 is a flowchart illustrating an embodiment of utilizing a PDU session request (session response) in case that NW-TT or DS-TT generates a sync message and provides sync to an external network of DS-TT in 5GS in a communication system according to an embodiment of the disclosure.

This embodiment may correspond to a case of using the structure of FIG. 9 or 10.

Referring to FIG. 17, operation S1701 may be the same as or similar to operation S1601 of FIG. 16.

Operation S1702 may be the same as or similar to operation S1602 of FIG. 16.

Operation S1703 may be the same as or similar to operation S1603 of FIG. 16.

Operation S1703a may be the same as or similar to operation S1603a of FIG. 16.

At operation S1704, the UE/DS-TT 1100 may transmit a PDU session establishment request to the SMF 1500. The request may include conditions, such as DNN/S-NSSAI, PDU session type, DS-TT capability, device type, and the like. At operation S1704a, the SMF 1500 may request and receive subscription information from the UDM 1700.

At operation S1705, the SMF 1500 may determine whether a PDU session establishment request matches the conditions including the residence time (valid time).

At operation S1706, the sync activation may be performed based on the matching conditions. For example, at operations 1706a and S1706b, the SMF 1500 may perform policy association with the PCF 1600. At operation S1706c, the SMF 1500 may transmit the sync activation request to the UPF/NW-TT 1300. In this case, the SMF 1500 may use the bridge management information container (BMIC) or the port management information container (PMIC) for the domain number (domain #n). At operation S1706d, the SMF 1500 may transmit the sync activation request to the UE/DS-TT. In this case, the SMF 1500 may use the PMIC for the domain number (domain #n).

Operation S1707a may be the same as or similar to operation S1607a of FIG. 16.

Operation S1707b may be the same as or similar to operation S1607b of FIG. 16.

Operation S1708a may be the same as or similar to operation S1608a of FIG. 16.

Operation S1708b-1 may be the same as or similar to operation S1608b-1 of FIG. 16.

Operation S1708b-2 may be the same as or similar to operation S1608b-2 of FIG. 16.

Figure 18:
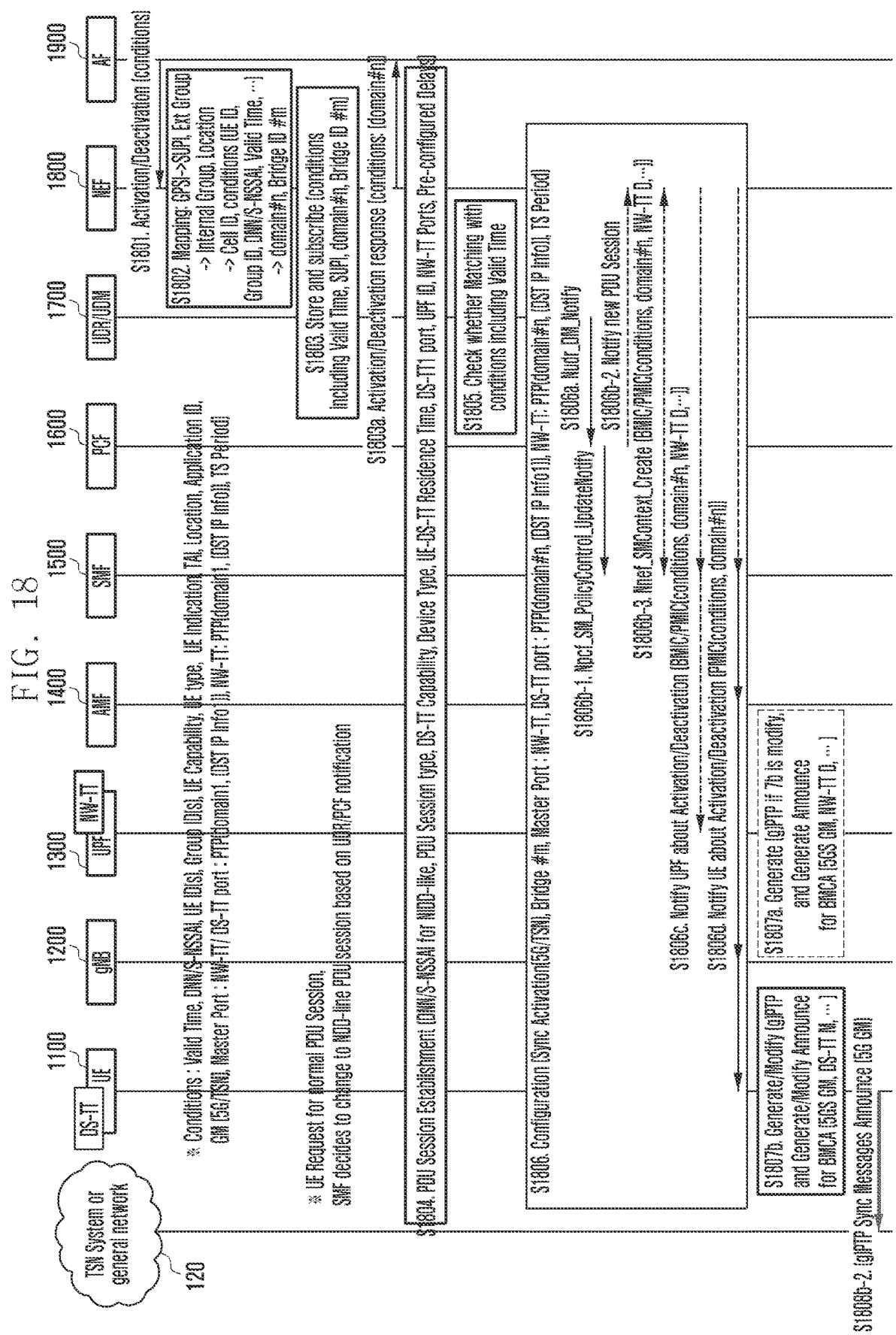
FIG. 18 is a flowchart illustrating an embodiment of utilizing a UDR notification in case that DS-TT generates a sync message and provides sync to an external network of DS-TT by using a PDU session that utilizes a control plane in 5GS in a communication system according to an embodiment of the disclosure.

FIG. 18 is a flowchart illustrating an embodiment of utilizing a UDR notification in case that DS-TT generates a sync message and provides sync to an outside of the DS-TT by using a PDU session that utilizes a control plane in 5GS in a communication system according to an embodiment of the disclosure.

This embodiment may correspond to a case of using the structure of FIG. 11 or 12.

Referring to FIG. 18, at operation S1801, the AF 1900 may transmit an activation/deactivation request of a 5GS sync service to the NEF 1800. In this case, added conditions may include the following contents.

Valid time: Valid period of the request and the like
DNN/S-NSSAI: Data network name and network slice ID of a PDU session
UE ID(s): Target UE ID (GPSI or others) and the like
Group ID(s): External group ID designated by AF and the like
UE capability: Sync support, DS-TT support, DS-TT GM support, sync generation support, and the like
UE type: Sync UE, TSC and IoT UE, and the like
UE indication: Indication indicating that the sync service is necessary, and the like
TAI: Location on the 5G system of cell ID based target UE
Location: Physical location of UE
Application ID: Application ID requested by AF
GM: Denoting whether to use a 5G GM or an external TSN GM
Master port: NW-TT/DS-TT port
Sync message format: gPTP/PTP
Sync domain: domain1 (time sync domain that may be omitted)
DST IP Info1: IP address of an external node that becomes a target when a PTP message is used
Sync accuracy: Time stamp period or granularity At operation S1802, the NEF 1800 may convert some of conditions received at operation S1801. For example, the GPSI may be converted into an IMSI being used inside the 5GS. The external group ID may be converted into the internal group ID being used inside the 5GS. The sync clock domain provided from the AF 1900 may be converted by the NEF 1800. The NEF 1800 may separately allocate a domain number (domain #n) to a combination of various conditions, such as UE ID, group ID, DNN/S-NSSAI, and valid time. When the AF 1900 requests activation of the sync based on the 5G GM clock 210, it may specify or may not specify the separate domain. The NEF 1800 having received the request may allocate the separate domain number (domain #n) so that the domain number does not collide with the domain ID already allocated to the 5GS bridge. Further, in case that the logical UPF 1300 is used as in FIG. 11, the bridge ID may be allocated by the logical UPF 1300, the SMF 1500, or the NEF 1800. Further, in case that the logical UPF 1300 is not used, but the PDU session that uses the control plane using the NEF 1800 is used as in FIG. 12, the bridge ID may be allocated by the NEF 1800 or the SMF 1500. FIG. 18 illustrates a case that the NEF 1800 allocates the bridge ID number (#n). At operation S1803, the NEF 1800 may store conditions including a valid time, SUPI, domain number (domain #n), and the like in the UDR 1700, and if needed, it may notify the UDM 1700 of the UDR 1700, or may provide the notification to the PCF 1600 later.

At operation S1803a, the NEF 1800 may transmit, to the AF 1900, a response notifying that the received contents including the converted domain number (domain #n) have been reflected in the 5GS.

At operation S1804, the UE/DS-TT 1100 may transmit a PDU session request to the SMF 1500. The request may include conditions, such as DNN/S-NSSAI, PDU session type, DS-TT capability, device type, and the like. Based on the request, the policy session between the SMF 1500 and the PCF 1600 may be configured. The SMF 1500 may determine whether to proceed with a later PDU session process by receiving subscriber information from the UDM 1700 and comparing the subscriber information with the above conditions. In case of proceeding with the process, the SMF 1500 may register the corresponding PDU session in the UDM 1700. In this case, the SMF 1500 may determine the PDU session that uses the logical UPF 1300 and the control plane or the PDU session based on the control plane using the NEF 1800 by checking the information received from the UDM 1700. Further, based on the request, the policy session between the SMF 1500 and the PCF 1600 may be configured.

At operation S1805, the UDR 1700 may determine whether the conditions including the valid time match one another based on the information transferred through the UDM 1700 when the PDU session is registered.

At operation S1806, sync activation may be performed based on the matching conditions. For example, at operation S1806a, the UDR 1700 may transmit the notification to the PCF 1600. At operation S1806b-1, the PCF 1600 may notify the SMF 1500 that the policy has been updated. At operation S1806b-2, the PCF 1600 may notify the NEF 1800 that a new PDU session has been generated. The NEF 1800 may receive necessary information about the new PDU session from the DS-TT 1100/NW-TT 1300. Operation S1806b-2 may be omitted. In case of using the configuration of FIG. 12, the SMF 1500, at operation S1806b-3, may configure a connection with the NEF 1800 based on Nnef_SMContext_Create. In case of using the configuration of FIG. 11, operation S1806b-3 may be omitted. In case of using the configuration of FIG. 11, the SMF 1500, at operation S1806c, may transmit the sync activation request to the logical UPF/MW-TT 1300. In this case, the SMF 1500 may use a bridge management information container (BMIC) or a port management information container (PMIC) for the domain number (domain #n). In this case, the SMF 1500 may not transmit the sync message to the outside of the NW-TT 1300 by configuring the port status of the logical NW-TT 1300 to be disable. If the NEF 1800 directly transfers the information through the new PDU session at operation S1806b-2, the process may be the process in which the SMF transfers the information that the NEF 1800 has transferred to the SMF through the PCF 1300. In case of the configuration of FIG. 12, operation S1806c may be omitted. AT operation S1806d, the SMF 1500 may transmit the sync activation request to the UE/DS-TT 1100. In this case, the SMF 1500 may use the PMIC for the domain number (domain #n). If the NEF 1800 directly transfers the information through the new PDU session at operation S1806b-2, the process may be the process in which the SMF 1500 transfers the information that the NEF 1800 has transferred to the SMF 1500 through the PCF 1600.

At operation S1807a, the logical UPF/NW-TT 1100 may not generate the sync message based on the 5G GM clock 210 based on the conditions configured at operation S1806, and may not transfer the sync message to the outside of the NW-TT 1300.

Since the NW-TT 1300 and the DS-TT 1100 do not transmit the sync message to each other, the traffic generation may be reduced, and thus the load of the UE or network entity may be reduced, and the power consumption may be reduced.

At operation S1807a, since the UPF/NW-TT 1300 does not transmit the sync to the outside, it may be configured not to periodically transmit the announce message for the BMCA based on the 5G GM clock 210.

At operation S1807b, the DS-TT 1100 may generate and transmit the sync message to the external nodes connected to the DS-TT 1100. In this case, the time stamp of the sync message may indicate the time when the sync message is generated. The NW-TT 1300 and the DS-TT 1100 may not transmit the sync message with each other. If the sync message is not transmitted, the traffic generation may be reduced, and thus the load of the UE or network entity may be reduced, and the power consumption may be reduced.

At operation S1807b, since the UE/DS-TT 1100 may be the subject that transmits the sync to the outside, it may be configured to periodically transmit the announce message for the BMCA based on the 5G GM clock 210 having the master port status.

As configured at operation S1807b, the UE/DS-TT 1100, at operation S1808, may transmit the sync message and the announce message to the outside.

Figure 19:
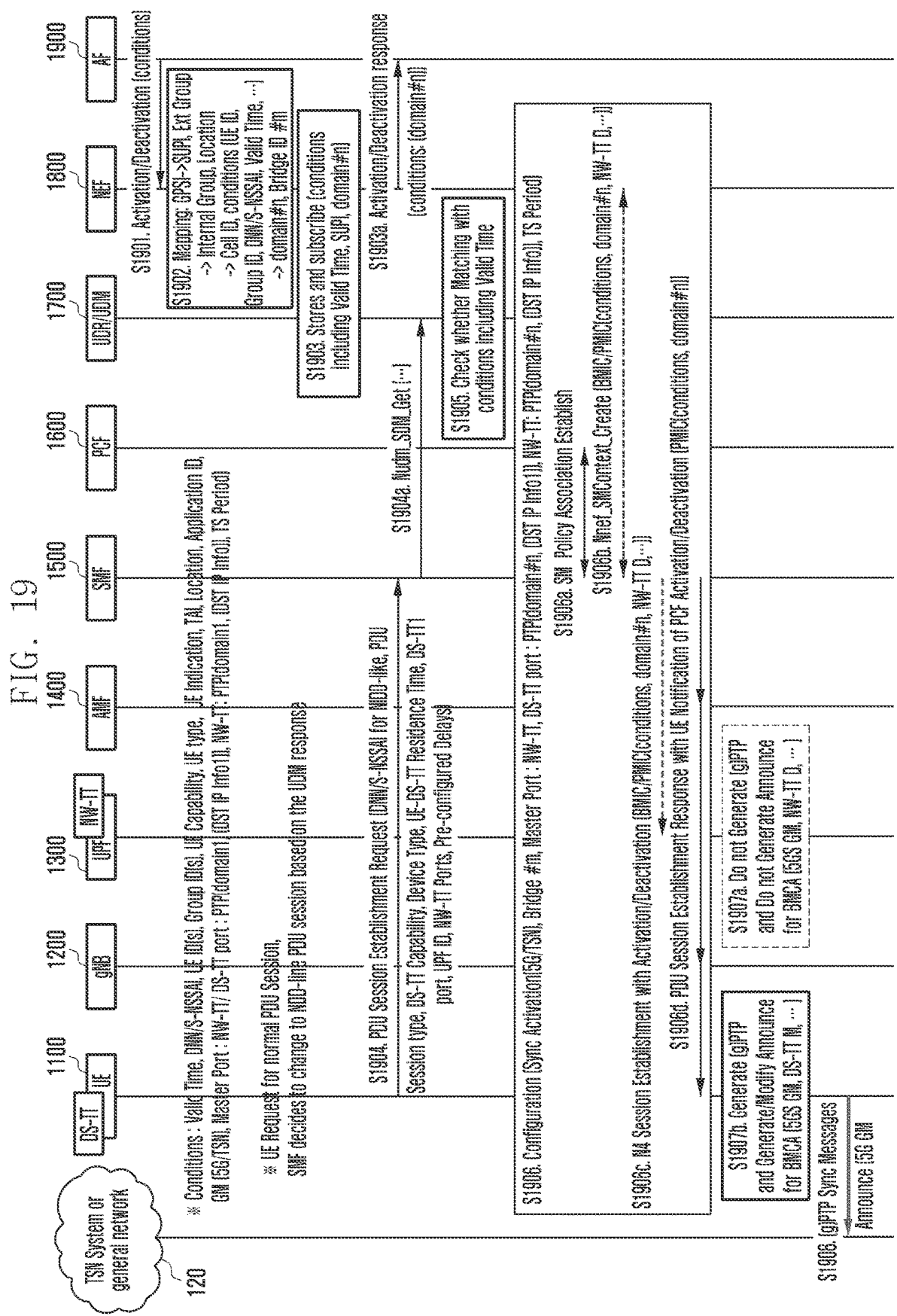
FIG. 19 is a flowchart illustrating an embodiment of utilizing a PDU session response in case that DS-TT generates a sync message and provides sync to an external network of DS-TT by using a PDU session that utilizes a control plane in 5GS in a communication system according to an embodiment of the disclosure.

FIG. 19 is a flowchart illustrating an embodiment of utilizing a PDU session request (session response) in case that DS-TT generates a sync message and provides sync to an external network of DS-TT by using a PDU session that utilizes a control plane in 5GS in a communication system according to an embodiment of the disclosure.

This embodiment may correspond to a case of using the structure of FIG. 11 or 12.

Referring to FIG. 19, operation S1901 may be the same as or similar to operation S1801 of FIG. 18.

Operation S1902 may be the same as or similar to operation S1802 of FIG. 18.

Operation S1903 may be the same as or similar to operation S1803 of FIG. 18.

Operation S1903a may be the same as or similar to operation S1803a of FIG. 18.

At operation S1904, the UE/DS-TT 1100 may transmit a PDU session establishment request to the SMF 1500. The request may include conditions, such as DNN/S-NSSAI, PDU session type, DS-TT capability, device type, and the like.

At operation S1904a, the SMF 1500 may receive the corresponding contents by requesting subscription information from the UDM 1700.

At operation S1905, the SMF 1500 may determine whether a PDU session establishment request matches the conditions including the valid time.

At operation S1906, the sync activation may be performed based on the matching conditions. At operations 1906a, the SMF 1500 may perform policy association with the PCF 1600. In case of using the configuration of FIG. 12, the SMF 1500, at operation S1906b, may configure the connection with the NEF 1800 based on the Nnef_SMContext_Create. In case of using the configuration of FIG. 11, the SMF 1500, at operation S1906c, may transmit the sync activation request to the UPF/NW-TT 1300. In this case, the SMF 1500 may use the bridge management information container (BMIC) or the port management information container (PMIC) for the domain number (domain #n). At operation S1906d, the SMF 1500 may transmit the sync activation request to the UE/DS-TT 1100. In this case, the SMF 1500 may use the PMIC for the domain number (domain #n).

Operation S1907a may be the same as or similar to operation S1807a of FIG. 18.

Operation S1907b may be the same as or similar to operation S1807b of FIG. 18.

Operation S1908 may be the same as or similar to operation S1808 of FIG. 18.

Figure 20:
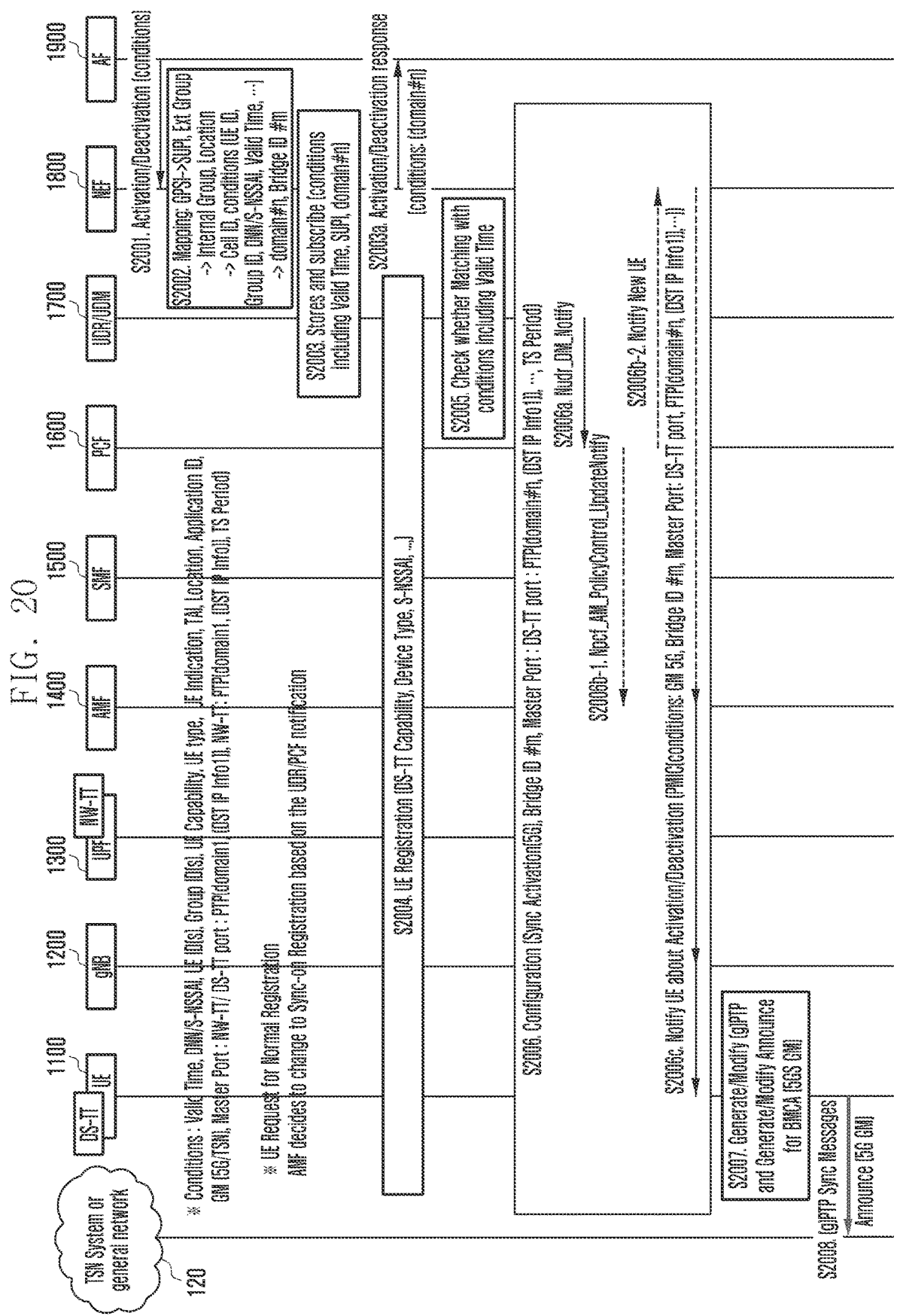
FIG. 20 is a conceptual diagram illustrating an embodiment of utilizing a UDR notification in case that DS-TT generates a sync message and provides sync to an external network of DS-TT without a PDU session in 5GS in a communication system according to an embodiment of the disclosure.

FIG. 20 is a flowchart conceptual diagram illustrating an embodiment of utilizing a UDR notification in case that the DS-TT 1100 generates a sync message and provides sync to an external network of the DS-TT 1100 without a PDU session in 5GS in a communication system according to an embodiment of the disclosure.

This embodiment may correspond to a case of using the structure of FIG. 13.

Referring to FIG. 20, at operation S2001, the AF 1900 may transmit an activation/deactivation request of a 5GS sync service to the NEF 1800. In this case, added conditions may include the following contents.

Valid time: Valid period of the request and the like
DNN/S-NSSAI: Data network name and network slice ID of a PDU session
UE ID(s): Target UE ID (GPSI or others) and the like
Group ID(s): External group ID designated by AF and the like
UE capability: Sync support, DS-TT support, DS-TT GM support, sync generation support, and the like
UE type: Sync UE, TSC and IoT UE, and the like
UE indication: Indication indicating that the sync service is necessary, and the like
TAI: Location on the 5G system of cell ID based target UE
Location: Physical location of UE
Application ID: Application ID requested by AF
GM: Denoting whether to use a 5G GM or an external TSN GM
Master port: NW-TT/DS-TT port
Sync message format: gPTP/PTP
Sync domain: domain1 (time sync domain that may be omitted)
DST IP Info1: IP address of an external node that becomes a target when a PTP message is used
Sync accuracy: Time stamp period or granularity At operation S2002, the NEF 1800 may convert some information of conditions received at operation S2001. For example, the GPSI may be converted into an IMSI being used inside the 5GS. The external group ID may be converted into the internal group ID being used inside the 5GS. The sync clock domain provided from the AF 1900 may be converted by the NEF 1800. The NEF 1800 may allocate a separate domain number (domain #n) to a combination of various conditions, such as UE ID, group ID, DNN/S-NSSAI, and residence time (valid time). When the AF 1900 transmits an activation request for the sync based on the 5G GM clock, it may specify or may not specify the separate domain. The NEF 1800 having received the request may allocate the separate domain number (domain #n) so that the domain number does not collide with the domain ID already allocated to the 5GS bridge.

At operation S2003, the NEF 1800 may store conditions including a valid time, SUPI, domain number (domain #n), and the like in the UDR 1700, and if needed, it may notify the UDM 1700 of the UDR 1700, or may provide the notification to the PCF 1600 later.

At operation S2003a, the NEF 1800 may transmit, to the AF 1900, a response notifying that the requested contents including the converted domain number (domain #n) have been reflected in the 5GS.

At operation S2004, the UE/DS-TT 1100 may transmit a registration request to AMF 1400. The request may include conditions, such as DNN/S-NSSAI, DS-TT capability, device type, and the like. In this case, the AMF 1400 may determine whether to continue proceeding with the registration process by obtaining and checking the subscriber information from the UDM 1700. In this case, connection between the AMF 1400 and the PCF 1600 may be configured.

At operation S2005, the UDR 1700 may determine whether the conditions including the valid time match one another based on the information transferred through the UDM 1700 when the UE is registered.

At operation S2006, the sync activation may be performed based on the matching conditions. For example, at operation S2006a, the UDR 1700 may transmit the notification to the PCF 1600. At operation S2006b-1, the PCF 1600 may notify the AMF 1400 that the policy has been updated. At operation S2006b-2, the PCF 1600 may notify the NEF 1800 that new UE has been registered. The NEF 1800 may obtain necessary information about the new UE from the DS-TT 1100. Operation S2006b-2 may be omitted.

At operation S2006c, the AMF 1400 may transmit the sync activation request to the UE/DS-TT 1100. In this case, the AMF 1400 may use the PMIC for the domain number (domain #n). If the NEF 1800 directly transmits new UE registration information to the NEF 1800 at operation S2006b-2, the process may be the process in which the AMF 1400 retransfers, to the UE/DS-TT 1100, the information that the NEF 1800 has transferred to the AMF 1400 through the PCF 1600.

At operation S2007, the DS-TT 1100 may generate and transmit the sync message to the external nodes connected to the DS-TT 1100. In this case, the time stamp of the sync message may indicate the time when the sync message is generated. The NW-TT 1300 and the DS-TT 1100 may not transmit the sync message with each other. Since the sync message is not transmitted, the traffic generation may be reduced, and thus the load of the UE or network entity may be reduced, and the power consumption may be reduced.

At operation S2007, since the UE/DS-TT 1100 may be the subject that transmits the sync to the outside, it may be configured to periodically transmit the announce message for the BMCA based on the 5G GM clock 210 having the master port status.

As configured at operation S2007, the UE/DS-TT 1100, at operation S2008, may transmit the sync message and the announce message to the outside.

Figure 21:
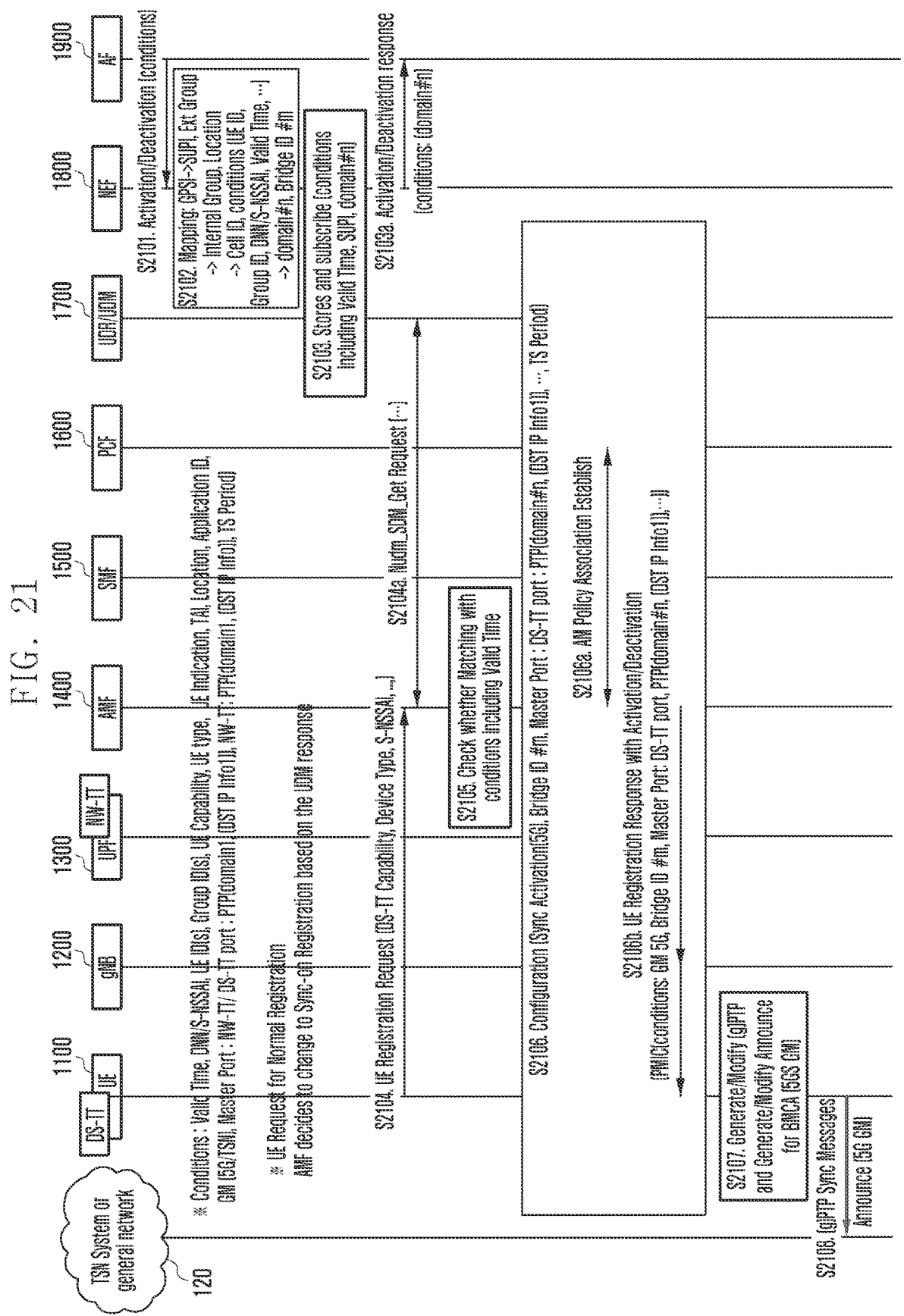
FIG. 21 is a flowchart illustrating an embodiment of utilizing a registration response in case that DS-TT generates a sync message and provides sync to an external network of DS-TT without a PDU session in 5GS in a communication system according to an embodiment of the disclosure.

FIG. 21 is a flowchart illustrating an embodiment of utilizing a registration response in case that DS-TT generates a sync message and provides sync to an external network of DS-TT without a PDU session in 5GS in a communication system according to an embodiment of the disclosure.

This embodiment may correspond to a case of using the structure of FIG. 13.

Referring to FIG. 21, operation S2101 may be the same as or similar to operation S2001 of FIG. 20.

Operation S2102 may be the same as or similar to operation S2002 of FIG. 20.

Operation S2103 may be the same as or similar to operation S2003 of FIG. 20.

Operation S2103a may be the same as or similar to operation S2003a of FIG. 20.

At operation S2104, the UE/DS-TT 1100 may transmit the registration request to the AMF 1400. The request may include conditions, such as DNN/S-NSSAI, DS-TT capability, device type, and the like.

At operation S2104a, the AMF 1400 may obtain the subscriber information from the UDM 1700.

At operation S2105, it may be identified whether the request matches the conditions including the valid time in accordance with the information transferred through the UDM 1700 when the UE is registered.

At operation S2106, the sync activation may be performed based on the matching conditions. For example, at operation S2106a, the AMF 1400 may configure the connection with the PCF 1600.

At operations 2106b, the AMF 1400 may transmit the sync activation request to the UE/DS-TT 1100. In this case, the AMF 1400 may use the PMIC for the domain number (domain #n).

Operation S2107 may be the same as or similar to operation S2007 of FIG. 20.

Operation S2108 may be the same as or similar to operation S2008 of FIG. 20.

Figure 22:
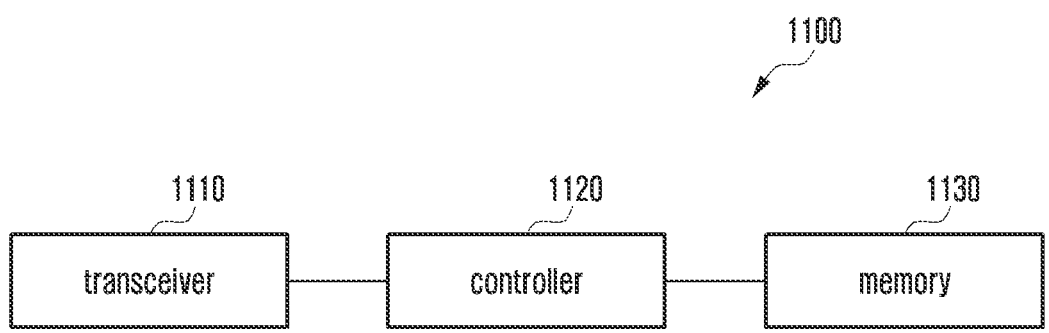
FIG. 22 is a block diagram illustrating UE in a communication system according to an embodiment of the disclosure.

FIG. 22 is a block diagram illustrating UE in a communication system according to an embodiment of the disclosure.

Referring to FIG. 22, UE 1100 may include a transceiver 1110, a controller 1120, and a memory 1130. The UE 1100 may additionally have more constituent elements depending on an implementation method thereof. For example, various additional devices, such as a display for a user interface, an input unit, and sensors, may be further included. The disclosure is not limited to such additional configurations.

The transceiver 1110 may be connected to gNB 1200 on a wireless channel based on the respective embodiments described with reference to FIGS. 1 to 21, and may perform transmission and reception of signals and/or messages with various kinds of network function devices through the gNB 1200. In case that the UE 1100 communicates with the 5G network, the transceiver 1110 may be a device that can perform transmission/reception with the 5G communication network. Further, the transceiver 1110, if needed, may include a communication processor.

In case that the transceiver 1100 does not include the communication processor, all signals and/or messages may be processed by the controller.

The controller 1120 may control the basic UE operations, and may control reception and storage of the messages described above with reference to FIGS. 1 to 21. For example, the controller 1120 may perform the operations based on those as described above with reference to FIGS. 1 to 21.

The memory 1130 may store various kinds of data necessary to control the UE 1100, and may have an area for storing various kinds of information as described above with reference to FIGS. 1 to 21.

Figure 23:
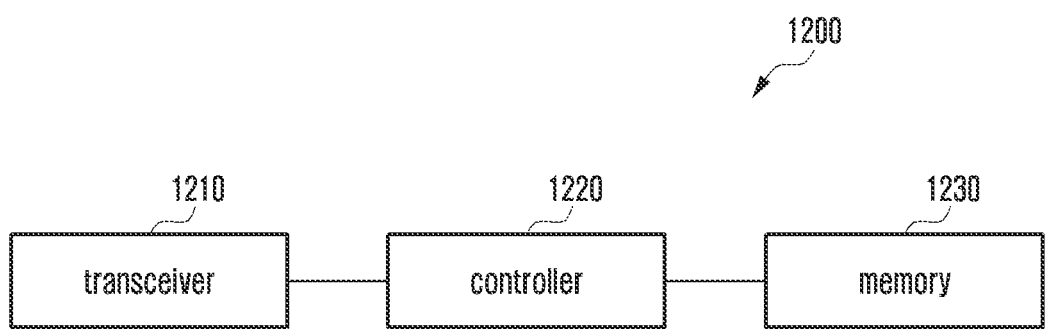
FIG. 23 is a block diagram illustrating a gNB in a communication system according to an embodiment of the disclosure.

FIG. 23 is a block diagram illustrating a gNB in a communication system according to an embodiment of the disclosure.

Referring to FIG. 23, the gNB 1200 may include a transceiver 1210, a controller 1220, and a memory 1230. The gNB 1200 may additionally have more constituent elements depending on an implementation method thereof. For example, various additional devices, such as a display for a user interface, an input unit, and sensors, may be further included. The disclosure is not limited to such additional configurations.

The transceiver 1210 may be connected to the UE on a wireless channel based on the respective embodiments described with reference to FIGS. 1 to 21, and may perform transmission and reception of signals and/or messages with various kinds of network function devices. In case that the base station communicates with the 5G network, the transceiver 1210 may be a device that can perform transmission/reception with the 5G communication network. Further, the transceiver 1210, if needed, may include a communication processor.

In case that the transceiver 1210 does not include the communication processor, all signals and/or messages may be processed by the controller.

The controller 1220 may control the basic operations of the gNB 1200, and may control reception and storage of the messages described above with reference to FIGS. 1 to 21. For example, the controller 1220 may perform the operations based on those as described above with reference to FIGS. 1 to 21.

The memory 1230 may store various kinds of data necessary to control the gNB 1200, and may have an area for storing various kinds of information as described above with reference to FIGS. 1 to 21.

Figure 24:
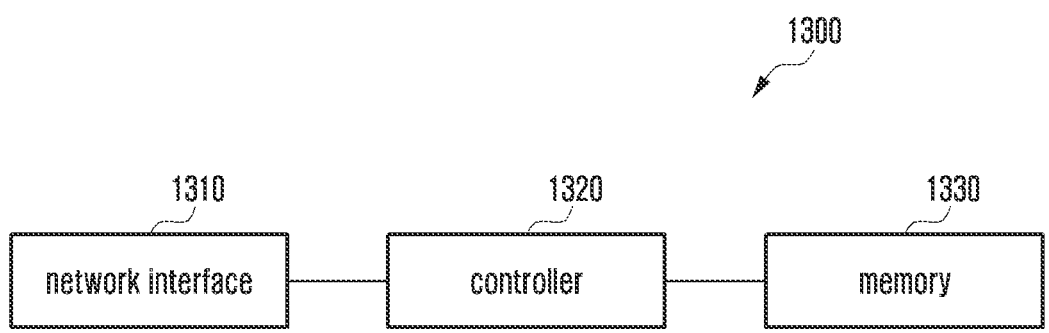
FIG. 24 is a block diagram illustrating a UPF in a wireless communication system according to an embodiment of the disclosure.

FIG. 24 is a block diagram illustrating a UPF in a wireless communication system according to an embodiment of the disclosure.

Referring to FIG. 24, the UPF 1300 may perform communication with other network entities of a core network through a network interface 1310. For example, the UPF 1300 may perform communication with UE 1100, gNB 1200, AMF 1400, SMF 1500, PCF 1600, UDR/UDM 1700, NEF 1800, and AF 1900.

A controller 1320 may be implemented by at least one processor or/and program for performing the operation of the UPF 1300. For example, the controller 1320 may perform the operation of the UPF 1300 as described above with reference to FIGS. 1 to 21.

A memory 1330 may store programs and various kinds of control information necessary for the controller 1320, and in addition, may store various kinds of information as described above with reference to FIGS. 1 to 21.

In addition to the configurations described above with reference to FIGS. 1 to 21, the UPF 1300 may further include various interfaces for accesses by an operator. The disclosure does not have special restrictions on such additional configurations.

Figure 25:
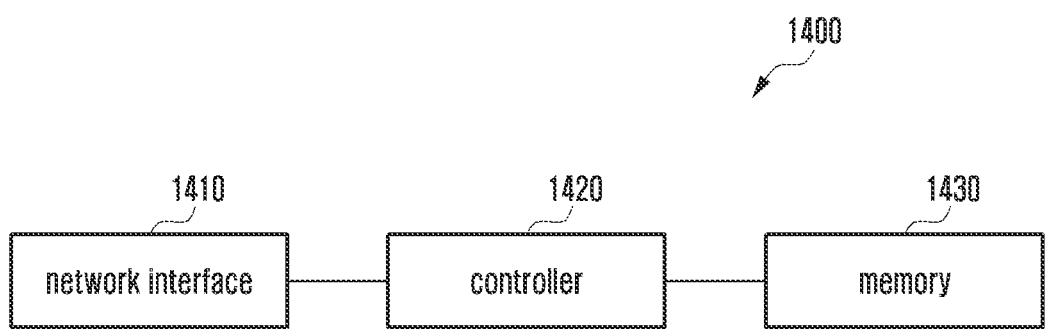
FIG. 25 is a block diagram illustrating an access and mobility management function (AMF) in a wireless communication system according to an embodiment of the disclosure.

FIG. 25 is a block diagram illustrating an AMF in a wireless communication system according to an embodiment of the disclosure.

Referring to FIG. 25, the AMF 1400 may perform communication with other network entities of a core network through a network interface 1410. For example, the AMF 1400 may perform communication with UE 1100, gNB 1200, UPF 1300, SMF 1500, PCF 1600, UDR/UDM 1700, NEF 1800, and AF 1900.

A controller 1420 may be implemented by at least one processor or/and program for performing the operation of the AMF 1400. For example, the controller 1420 may perform the operation of the AMF 1400 as described above with reference to FIGS. 1 to 21.

A memory 1430 may store programs and various kinds of control information necessary for the controller 1420, and in addition, may store various kinds of information as described above with reference to FIGS. 1 to 21.

In addition to the configurations described above with reference to FIGS. 1 to 21, the AMF 1400 may further include various interfaces for accesses by an operator. The disclosure does not have special restrictions on such additional configurations.

Figure 26:
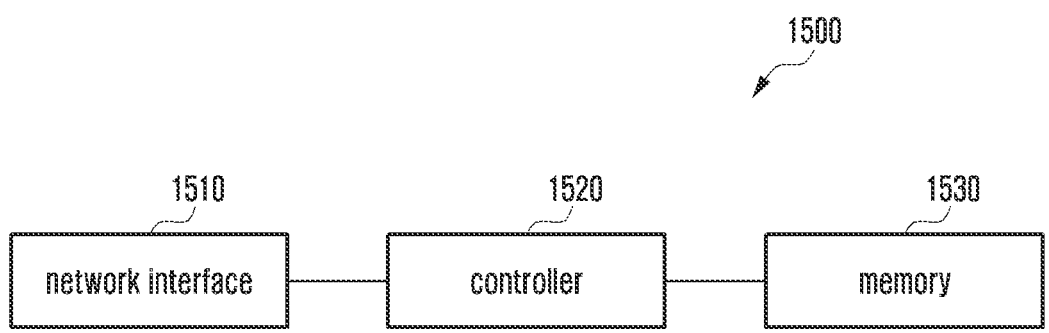
FIG. 26 is a block diagram illustrating an SMF in a wireless communication system according to an embodiment of the disclosure.

FIG. 26 is a block diagram illustrating an SMF in a wireless communication system according to an embodiment of the disclosure.

Referring to FIG. 26, the SMF 1500 may perform communication with other network entities of a core network through a network interface 1510. For example, the SMF 1500 may perform communication with UE 1100, gNB 1200, UPF 1300, AMF 1400, PCF 1600, UDR/UDM 1700, NEF 1800, and AF 1900.

A controller 1520 may be implemented by at least one processor or/and program for performing the operation of the SMF 1500. For example, the controller 1520 may perform the operation of the SMF 1500 as described above with reference to FIGS. 1 to 21.

A memory 1530 may store programs and various kinds of control information necessary for the controller 1520, and in addition, may store various kinds of information as described above with reference to FIGS. 1 to 21.

In addition to the configurations described above, the SMF 1500 may further include various interfaces for accesses by an operator. The disclosure does not have special restrictions on such additional configurations.

Figure 27:
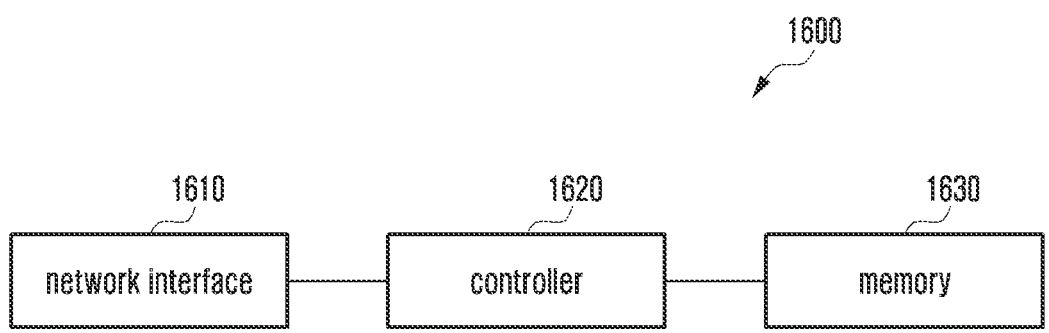
FIG. 27 is a block diagram illustrating a PCF in a wireless communication system according to an embodiment of the disclosure.

FIG. 27 is a block diagram illustrating a PCF in a wireless communication system according to an embodiment of the disclosure.

Referring to FIG. 27, the PCF 1600 may perform communication with other network entities of a core network through a network interface 1610. For example, the PCF 1600 may perform communication with UE 1100, gNB 1200, UPF 1300, AMF 1400, SMF 1500, UDR/UDM 1700, NEF 1800, and AF 1900.

A controller 1620 may be implemented by at least one processor or/and program for performing the operation of the PCF 1600. For example, the controller 1620 may perform the operation of the PCF 1600 as described above with reference to FIGS. 1 to 21.

A memory 1630 may store programs and various kinds of control information necessary for the controller 1620, and in addition, may store various kinds of information as described above with reference to FIGS. 1 to 21.

In addition to the configurations described above, the PCF 1600 may further include various interfaces for accesses by an operator. The disclosure does not have special restrictions on such additional configurations.

Figure 28:
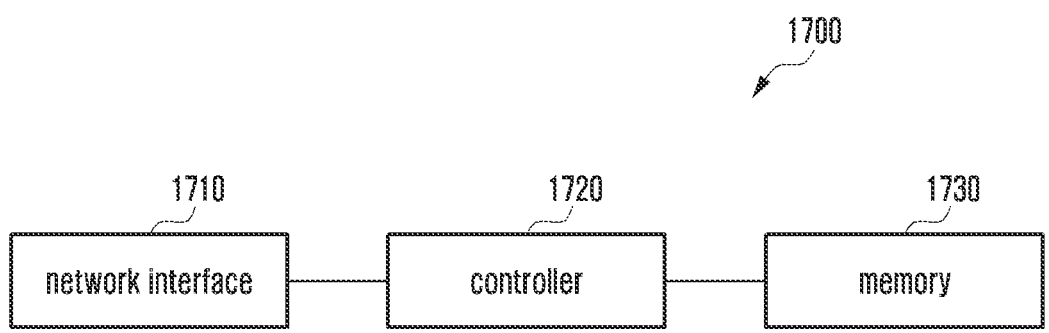
FIG. 28 is a block diagram illustrating UDR/UDM in a wireless communication system according to an embodiment of the disclosure.

FIG. 28 is a block diagram illustrating a UDR/UDM in a wireless communication system according to an embodiment of the disclosure.

Referring to FIG. 28, the UDR/UDM 1700 may perform communication with other network entities of a core network through a network interface 1710. For example, the UDR/UDM 1700 may perform communication with UE 1100, gNB 1200, UPF 1300, AMF 1400, SMF 1500, PCF 1600, NEF 1800, and AF 1900.

A controller 1720 may be implemented by at least one processor or/and program for performing the operation of the UDR/UDM 1700. For example, the controller 1720 may perform the operation of the UDR/UDM 1700 as described above with reference to FIGS. 1 to 21.

A memory 1730 may store programs and various kinds of control information necessary for the controller 1720, and in addition, may store various kinds of information as described above with reference to FIGS. 1 to 21.

In addition to the configurations described above, the UDR/UDM 1700 may further include various interfaces for accesses by an operator. The disclosure does not have special restrictions on such additional configurations.

Figure 29:
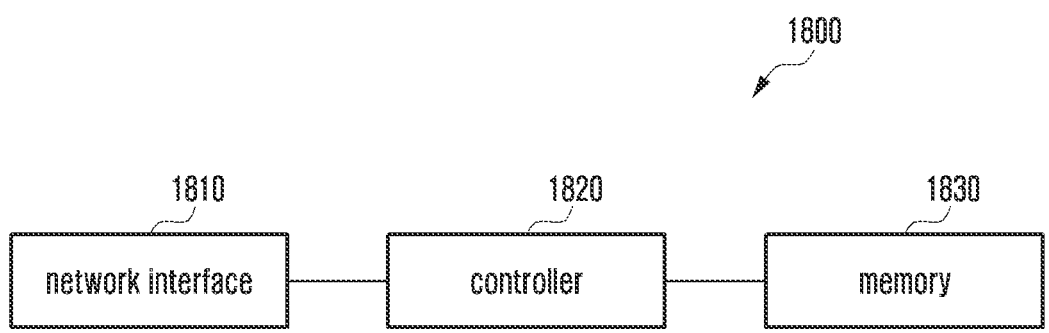
FIG. 29 is a block diagram illustrating an NEF in a wireless communication system according to an embodiment of the disclosure.

FIG. 29 is a block diagram illustrating an NEF in a wireless communication system according to an embodiment of the disclosure.

Referring to FIG. 29, the NEF 1800 may perform communication with other network entities of a core network through a network interface 1810. For example, the NEF 1800 may perform communication with UE 1100, gNB 1200, UPF 1300, AMF 1400, SMF 1500, PCF 1600, UDR/UDM 1700, and AF 1900.

A controller 1820 may be implemented by at least one processor or/and program for performing the operation of the NEF 1800. For example, the controller 1820 may perform the operation of the NEF 1800 as described above with reference to FIGS. 1 to 21.

A memory 1830 may store programs and various kinds of control information necessary for the controller 1820, and in addition, may store various kinds of information as described above with reference to FIGS. 1 to 21.

In addition to the configurations described above, the NEF 1800 may further include various interfaces for accesses by an operator. The disclosure does not have special restrictions on such additional configurations.

Figure 30:
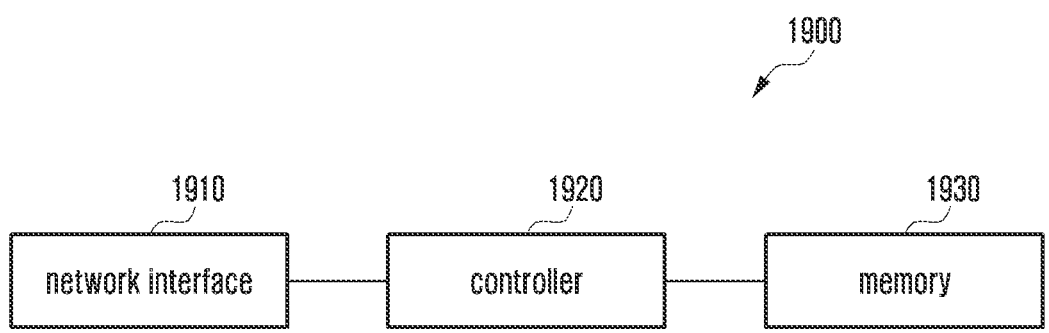
FIG. 30 is a block diagram illustrating an AF in a wireless communication system according to an embodiment of the disclosure.

FIG. 30 is a block diagram illustrating an AF in a wireless communication system according to an embodiment of the disclosure.

Referring to FIG. 30, the AF 1900 may perform communication with other network entities of a core network through a network interface 1910. For example, the AF 1900 may perform communication with UE 1100, gNB 1200, UPF 1300, AMF 1400, SMF 1500, PCF 1600, UDR/UDM 1700, and NEF 1800.

A controller 1920 may be implemented by at least one processor or/and program for performing the operation of the AF 1900. For example, the controller 1920 may perform the operation of the AF 1900 as described above with reference to FIGS. 1 to 21.

A memory 1930 may store programs and various kinds of control information necessary for the controller 1920, and in addition, may store various kinds of information as described above with reference to FIGS. 1 to 21.

In addition to the constitutions described above, the AF 1900 may further include various interfaces for accesses by an operator. The disclosure does not have special restrictions on such additional constitutions.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out operations of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as a field programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card. In an embodiment of the disclosure, a unit or module may include one or more processors.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method of a network exposure function (NEF) in a communication system, the method comprising:
   receiving, from an application function (AF), a synchronization information including at least one of a valid time, a time domain for a time synchronization service, a generic public subscription identifier (GPSI), an external group ID, or a synchronization clock domain;
   generating a synchronization activation request message based on the synchronization information;
   receiving, from a policy control function (PCF), a notification message indicating a packet data unit (PDU) session; and
   transmitting, to at least one of a user equipment (UE) and a user plane function (UPF), the synchronization activation request message,
   wherein the synchronization activation request message includes at least one of an international mobile subscriber identity (IMSI), an internal group ID, or a grandmaster (GM) clock domain,
   wherein the IMSI is transformed from the GPSI,
   wherein the internal group ID is transformed from the external group ID, and
   wherein the GM clock domain is transformed from the synchronization clock domain.

2. The method of claim 1, further comprising:
   transmitting, to a unified data management (UDM), the synchronization activation request message,
   wherein the synchronization activation request message is stored in a unified data repository (UDR).

3. The method of claim 1, further comprising:
   transmitting, to the AF, a response message in response to the synchronization information,
   wherein the response message includes the synchronization activation request message.

4. A method of a user equipment (UE) in a communication system, the method comprising:

transmitting a packet data unit (PDU) session request message to a network entity of a first communication network;
receiving a synchronization activation request message from the network entity in response to the PDU session request message, based on a valid time for a time synchronization service;
generating a synchronization message based on the synchronization activation request message; and
transmitting the synchronization message to a communication node of a second communication network,
wherein the synchronization activation request message is generated based on a synchronization information including at least one of the valid time, a time domain for a time synchronization service, a generic public subscription identifier (GPSI), an external group ID, or a synchronization clock domain,
wherein the synchronization activation request message includes at least one of an international mobile subscriber identity (IMSI), an internal group ID, or a grandmaster (GM) clock domain,
wherein the IMSI is transformed from the GPSI,
wherein the internal group ID is transformed from the external group ID, and
wherein the GM clock domain is transformed from the synchronization clock domain.

5. The method of claim 4, wherein the synchronization activation request message is generated further based on a bridge management information container (BMIC) for a number of domain (domain #n) or a port management information container (PMIC).

6. The method of claim 4, wherein the synchronization message is generated based on a grandmaster (GM) clock of the first communication network.

7. The method of claim 4, wherein the UE operates as a device-side time sensitive networking (TSN) translator (DS-TT).

8. The method of claim 4, wherein the PDU session request message includes information related to at least one of data network name/single-network slice selection assistance information (DNN/S-NSSAI), PDU session type, capability of the UE, or a device type of the UE.

9. A method of a user plane function (UPF) in a communication system, the method comprising:
transmitting a packet data unit (PDU) session request message to a network entity of a first communication network;
receiving a synchronization activation request message from the network entity in response to the PDU session request message, based on a valid time for a time synchronization service;
generating a synchronization message based on the synchronization activation request message; and
transmitting the synchronization message to a communication node of a second communication network,
wherein the synchronization activation request message is generated based on a synchronization information including at least one of the valid time, a time domain for a time synchronization service, a generic public subscription identifier (GPSI), an external group ID, or a synchronization clock domain,
wherein the synchronization activation request message includes at least one of an international mobile subscriber identity (IMSI), an internal group ID, or a grandmaster (GM) clock domain,
wherein the IMSI is transformed from the GPSI,
wherein the internal group ID is transformed from the external group ID, and
wherein the GM clock domain is transformed from the synchronization clock domain.

10. The method of claim 9, wherein the synchronization activation request message is generated further based on a bridge management information container (BMIC) for a number of domain (domain #n) or a port management information container (PMIC).

11. The method of claim 9, wherein the synchronization message is generated based on a grandmaster (GM) clock of the first communication network.

12. The method of claim 9, wherein the UPF operates as a network-side time sensitive networking (TSN) translator (NS-TT).

13. The method of claim 9, wherein the PDU session request message includes information related to at least one of data network name/single-network slice selection assistance information (DNN/S-NSSAI), PDU session type, capability of a user equipment (UE), or a device type of the UE.

14. A method of a network entity in a communication system, the method comprising:
receiving a packet data unit (PDU) session request message from a user equipment (UE) of a first communication network;
generating a synchronization activation request message in response to the PDU session request message; and
transmitting the synchronization activation request message to the UE and a user plane function (UPF) based on a valid time for a time synchronization service,
wherein the synchronization activation request message is generated based on a synchronization information including at least one of the valid time, a time domain for a time synchronization service, a generic public subscription identifier (GPSI), an external group ID, or a synchronization clock domain,
wherein the synchronization activation request message includes at least one of an international mobile subscriber identity (IMSI), an internal group ID, or a grandmaster (GM) clock domain,
wherein the IMSI is transformed from the GPSI,
wherein the internal group ID is transformed from the external group ID, and
wherein the GM clock domain is transformed from the synchronization clock domain.

15. The method of claim 14, wherein the synchronization activation request message is generated further based on a bridge management information container (BMIC) for a number of domain (domain #n) or a port management information container (PMIC).

16. The method of claim 14,
wherein the synchronization activation request message is generated based on, a registration information and policy update information,
wherein the registration information is received from a unified data management (UDM) based on the PDU session request message, and
wherein the policy update information is received from a policy control function (PCF).

17. The method of claim 14, wherein the network entity is a session management function (SMF) or a unified data repository (UDR).

18. The method of claim 14, wherein the PDU session request message includes information related to at least one of data network name/single-network slice selection assistance information (DNN/S-NSSAI), PDU session type, capability of the UE, or a device type of the UE.

* * * * *